(12) United States Patent
Sakhnini et al.

(10) Patent No.: US 11,876,656 B2
(45) Date of Patent: Jan. 16, 2024

(54) SCALABLE TD RS PATTERN AND DYNAMIC INDICATION

(71) Applicant: QUALCOMM Incorporated, San Diego, CA (US)

(72) Inventors: Iyab Issam Sakhnini, San Diego, CA (US); Tao Luo, San Diego, CA (US); Jing Sun, San Diego, CA (US); Jun Ma, San Diego, CA (US); Juan Montojo, San Diego, CA (US); Xiaoxia Zhang, San Diego, CA (US); Junyi Li, Franklin Park, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 17/242,247

(22) Filed: Apr. 27, 2021

(65) Prior Publication Data

US 2022/0345344 A1    Oct. 27, 2022

(51) Int. Cl.
*H04L 27/26* (2006.01)
*H04L 5/00* (2006.01)

(52) U.S. Cl.
CPC .......... *H04L 27/2613* (2013.01); *H04L 5/005* (2013.01); *H04L 27/2607* (2013.01)

(58) Field of Classification Search
CPC .. H04L 27/2607; H04L 27/2613; H04L 5/005
See application file for complete search history.

(56) References Cited

U.S. PATENT DOCUMENTS

| 2012/0051445 A1* | 3/2012 | Frank | H04L 5/0048 375/259 |
| 2013/0034064 A1* | 2/2013 | Nam | H04L 5/0091 370/329 |
| 2016/0127095 A1* | 5/2016 | Chen | H04L 5/0048 370/329 |
| 2018/0192432 A1* | 7/2018 | Tenny | H04W 16/28 |
| 2020/0154465 A1* | 5/2020 | Manolakos | H04L 5/0051 |
| 2020/0367284 A1* | 11/2020 | Lei | H04W 74/0808 |
| 2021/0392679 A1* | 12/2021 | Kim | H04W 72/23 |
| 2022/0053567 A1* | 2/2022 | Lei | H04L 5/0048 |
| 2022/0417776 A1* | 12/2022 | Manolakos | H04W 24/10 |

FOREIGN PATENT DOCUMENTS

WO    WO-2021156826 A1 *   8/2021

* cited by examiner

*Primary Examiner* — Melvin C Marcelo
*Assistant Examiner* — Natali Pascual Peguero
(74) *Attorney, Agent, or Firm* — Procopio, Cory, Hargreaves & Savitch LLP

(57) ABSTRACT

A base station may transmit at least one configuration of at least one set of one or more TD RS occasions associated with at least one type of reference signal measurement and an indication to dynamically activate or deactivate at least one pattern of the one or more TD RS occasions. A UE may receive one or more TD RS in at least one set of one or more TD RS occasions based on at least one configuration and the one or more of the at least one pattern of the one or more TD RS occasions.

34 Claims, 12 Drawing Sheets

SCALABLE TD RS PATTERN AND DYNAMIC INDICATION

TECHNICAL FIELD

The present disclosure relates generally to communication systems, and more particularly, to a method of wireless communication including time division (TD) reference signals.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station or a user equipment (UE). The base station may transmit at least one configuration of at least one set of one or more time-division reference signal (TD RS) occasions associated with at least one type of reference signal measurement. The type of reference signal measurement may be a particular measurement, e.g., channel estimation, tracking, beam management, etc. or may refer to a quality level for the measurement. At least one of a reference signal sequence or a TD RS occasion length for one or more TD RS occasions may be defined.

The base station may transmit an indication to dynamically activate or deactivate at least one pattern of one or more TD RS occasions. In one aspect, at least one pattern of one or more TD RS occasions may include a default pattern of one or more TD RS occasions. In another aspect, the indication of at least one pattern of one or more TD RS occasions may include a time duration for repeating at least one pattern of the one or more TD RS occasions.

The UE may receive one or more TD RS in at least one set of one or more TD RS occasions based on at least one configuration of the one or more TD RS occasions and an indication of at least one pattern of the one or more TD RS occasions. In one aspect, TD RS occasions may include the same base sequence or different sequences. In another aspect, the TD RS occasions may be configured contiguously or non-contiguously.

The UE may also process the TD RS in one or more TD RS occasions. In one aspect, the UE may process a first TD RS in a group of TD RS occasions of at least one set of one or more TD RS occasions based on a first configuration of the at least one configuration, where the group of TD RS occasions includes more than one sets of one or more TD RS occasions. In another aspect, the UE may process a second TD RS in a subset of at least one set of one or more TD RS occasions based on a second configuration of at least one configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
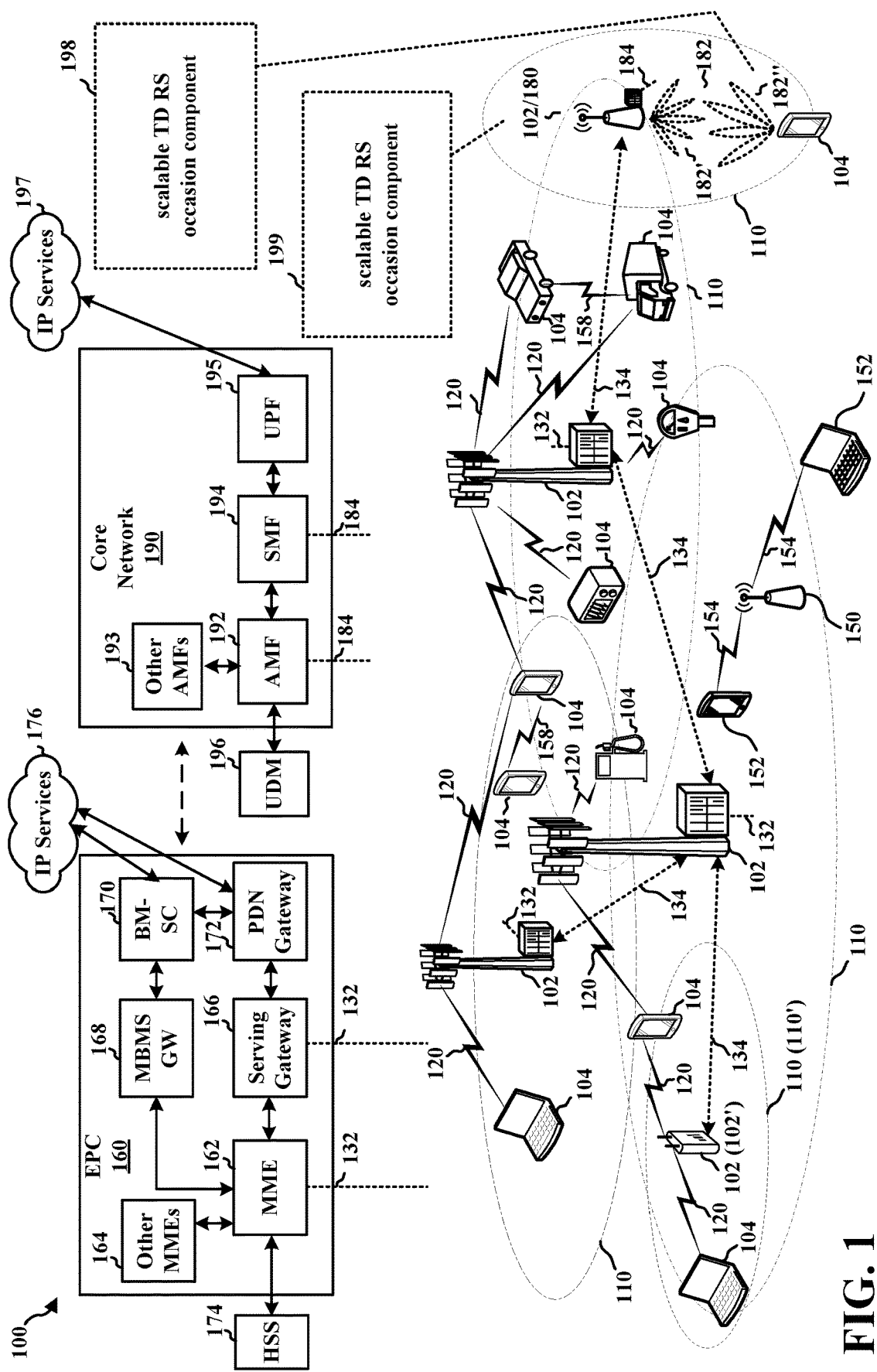
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a scalable TD RS occasion component 198 configured to receive, from a base station, at least one configuration of at least one set of one or more TD RS occasions associated with at least one type of reference signal measurement, and receive, from the base station, a one or more TD RS in the at least one set of one or more TD RS occasions based on the at least one configuration of the at least one set of one or more TD RS occasions. In certain aspects, the base station 180 may include a scalable TD RS occasion component 199 configured to transmit, to a UE, at least one configuration of at least one set of one or more TD RS occasions associated with at least one type of reference signal measurement, and transmit one or more TD RS in at least one set of the one or more TD RS occasions to the UE based on the at least one configuration of the at least one set of one or more TD RS occasions. Although the following description may be focused on 5G NR, the concepts described herein may be applicable to other similar areas, such as LTE, LTE-A, CDMA, GSM, and other wireless technologies.

Figure 2:
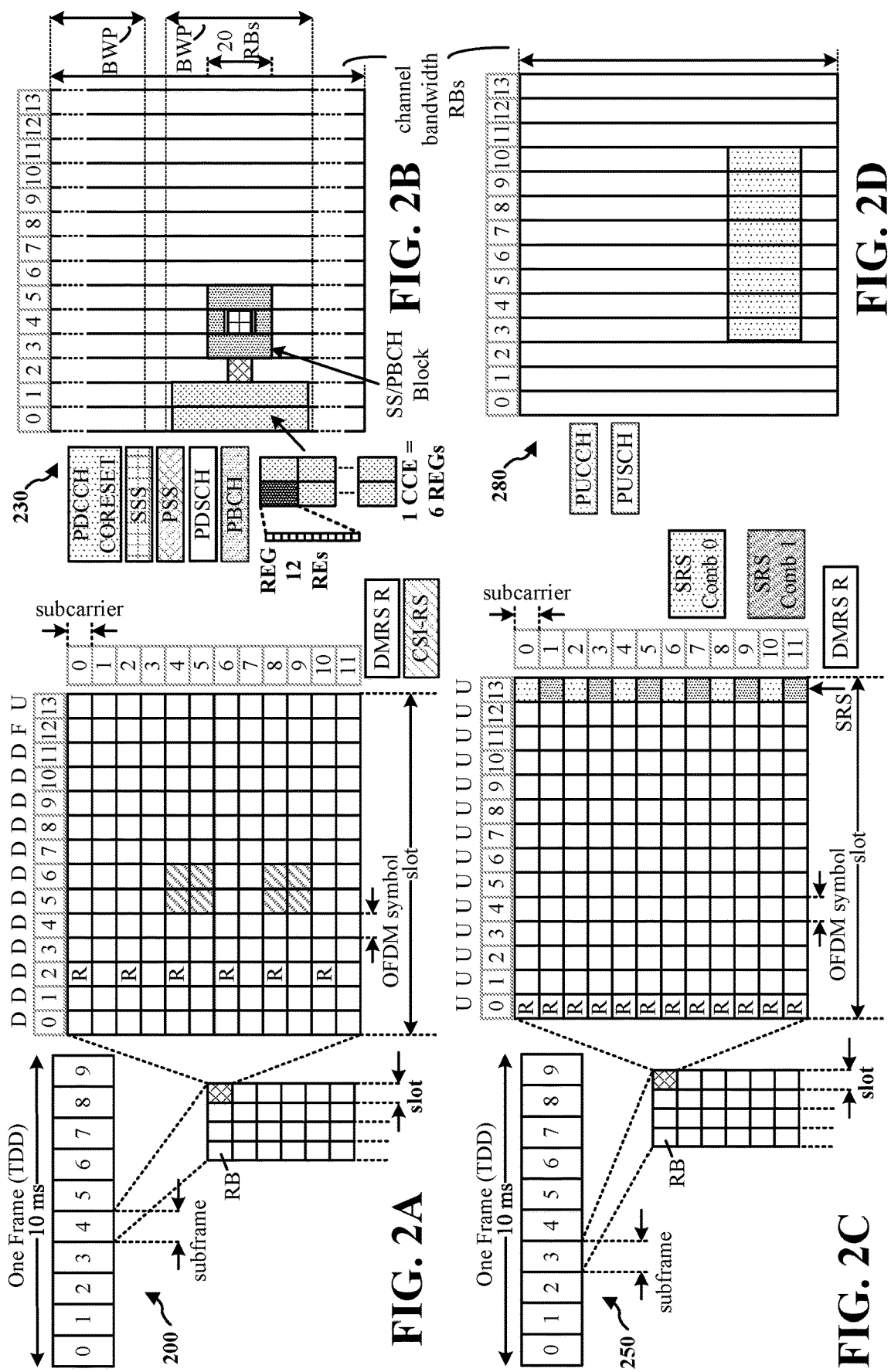
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the cyclic prefix (CP) is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
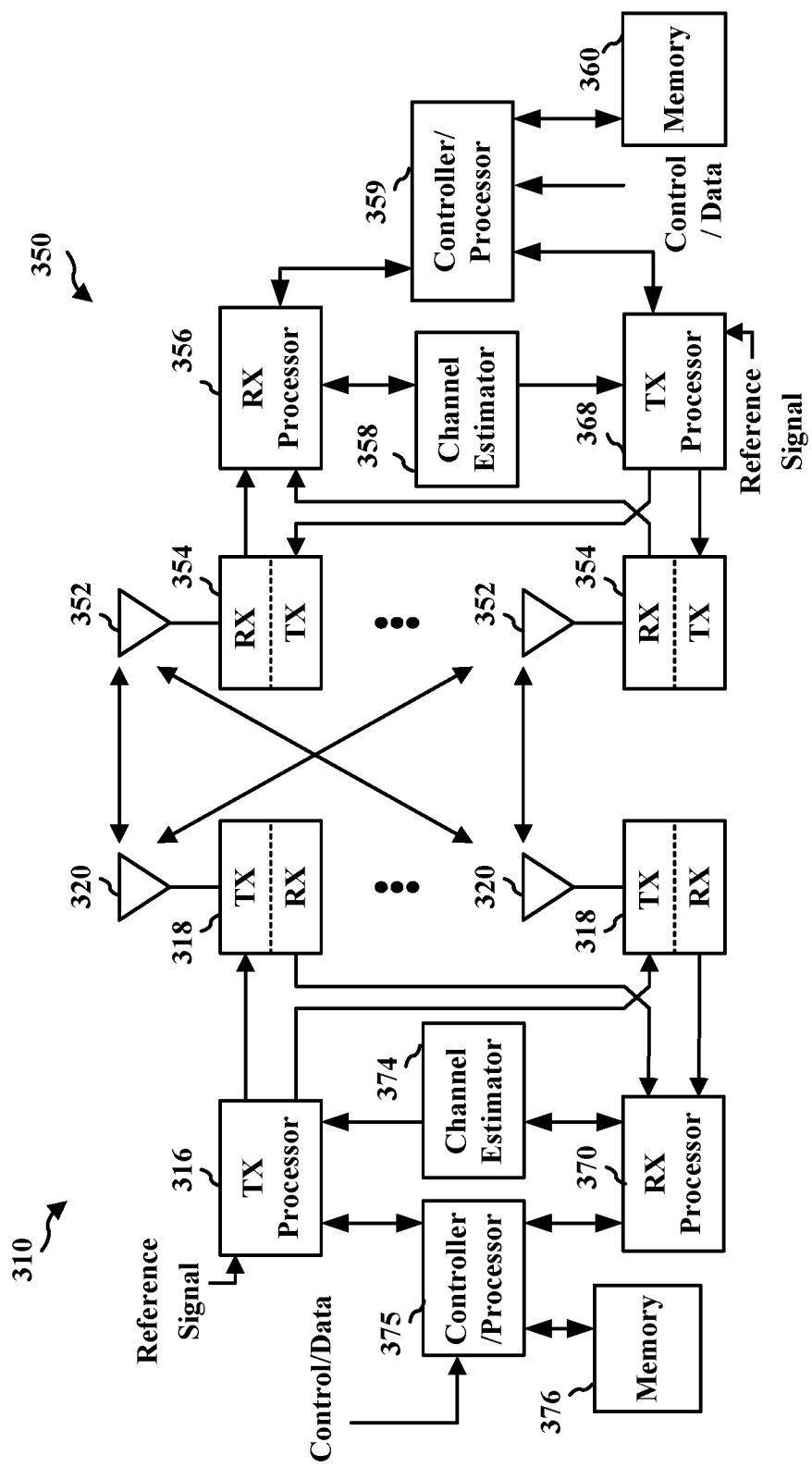
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

In some aspects, the higher NR operating bands may have a larger BW than the lower NR operating bands. For a larger BW, various waveforms may be considered for the DL operation. That is, the various waveforms are considered for the DL operation in the higher NR operating bands in consideration of various categories such as cell coverage, operation complexity, spectral efficiency, etc.

In one aspect, the waveforms may include OFDM-based waveforms. However, using such waveforms in association with high-frequency ranges/frequency bands may result in decreased energy efficiency (e.g., for power amplifiers (PAs)) based on an increased peak to average power ratio (PAPR) of the waveforms. The decreased energy efficiency may be caused by non-linear processing effects of the high-frequency ranges/frequency bands, and the increased PAPR may cause reduced coverage of the signal on the OFDM-based waveforms. In cases where energy efficiency requirements are more relaxed, the OFDM-based waveforms may be used to provide improved spectral efficiency and increased signal-to-noise ratio (SNR). The OFDM-based waveforms may have improved bandwidth utilization based on no guard band being provided and may achieve an increased data rate from providing high order MIMO. The OFDM-based waveforms may also have improved operation simplicity based on a single tap frequency domain equalization (FDE) and easy frequency division multiplexing (FDM) capability. The OFDM-based waveforms may also be backward compatible with lower frequency ranges, such as FR1, FR2, FR2x, etc.

In some aspects, single carrier waveforms may be used for high-frequency ranges, such as FR4, FR5, and other high-frequency ranges. "Single carrier" may refer to a QAM (SC-QAM) signal that is not based on DFT precoded algorithms. Single carrier waveforms may be used for cases where energy efficiency requirements are more stringent, as single carrier waveforms may have a lower PAPR than multi-carrier waveforms. A decreased PAPR may correspond to an increased PA efficiency and/or an extended battery life for a device. In some cases, the decreased PAPR may provide improved coverage for the device. A UE may be a device associated with more stringent energy efficiency requirements.

Single carrier waveforms may further provide an increased data rate based on an increased available spectrum size in the high-frequency ranges. Thus, even though the spectral efficiency of single carrier waveforms may be less than the spectral efficiency of OFDM-based waveforms, a comparable data rate to a data rate of the OFDM-based waveforms may be provided by the single carrier waveforms based on the increased available spectrum size.

The single carrier waveforms may be a single carrier frequency domain implementation, e.g., DFT-s-OFDM, or a single carrier time domain implementation, e.g., SC-QAM. The single carrier frequency domain implementation may have improved bandwidth utilization based on no guard band being provided and may have improved operation simplicity based on a single tap FDE. The single carrier time domain implementation may have improved operation simplicity based on no FFT or IFFT being involved. The single carrier time domain implementation may include some implementation utilizing a CP to add an FDE support, e.g., SC-FDE.

For single carrier waveforms, one or more channels (or signals), e.g., PDCCH, PDSCH, DMRS, SRS, etc., may be time division multiplexed. That is, one or more channels of the single carrier waveforms may be multiplexed in the time domain. Compared to the CP-OFDM, the channels and/or the signals for the single carrier may share the same BW and only differ in the time domain allocation. In some aspects, the demodulation reference signal (DMRS) of each of the one or more channels in the single carrier may have the same BW. For example, the DMRS for the PDCCH and the DMRS for the PDSCH may be configured to have the same BW. Accordingly, the base station and the UE may share the same RS for one or more channels in the single carrier that has the same BW, in some cases, and reduce the signaling overhead. The shared TD RS may be reused for different purposes. For example, the TD RS for the SRS may be used for channel estimation (or tracking) and beam management purposes.

In some aspects, certain TD RS may be configured to be shared across different channels and/or for different purposes. In one aspect, the same TD RS may be configured to be shared by one or more channels. For example, the same DMRS may be used by PDCCH and PDSCH. In another aspect, the same TD RS may be configured to be shared by more instances of a certain channel. For example, a CSI-RS may be used for beam management and channel estimation for PDCCH. In another aspect, the same TD RS may be configured to be reused for multiple uses. For example, an SRS may be used for PUSCH channel estimation as well as beam management.

In OFDM waveforms, the RSs for different purposes may be designed to have different frequency domain and/or time domain densities depending on the purpose and the quality associated with the RS. In case the single carrier waveform has the BW of 275 RBs, i.e., same as the maximum number of RBs allocated for NR, the number of associated time domain samples may be calculated based on the patterns of DMRS allocated in 12 sub-carriers per RB. In one example, the DMRS for the PDSCH may be allocated every other sub-carrier per RB in the frequency domain, and the number of time domain samples may be calculated as 275×6=1650 time domain samples. In another example, the DMRS for the PDCCH may be allocated every other 4 sub-carriers per RB in the frequency domain, and the number of time domain samples may be calculated as 275×3=825 time domain samples. In another example, the CSI-RS may have density 1, i.e., one per each RB and the number of time domain samples may be 275 time domain samples. Accordingly, for the single carrier waveform, we may configure different RSs to have a different number of time domain samples. In some aspects, the implementation and operation of the base station and the UE may be simplified by providing a unified RS design that may be scaled for different channels or different instances of a certain channel.

Figure 4:
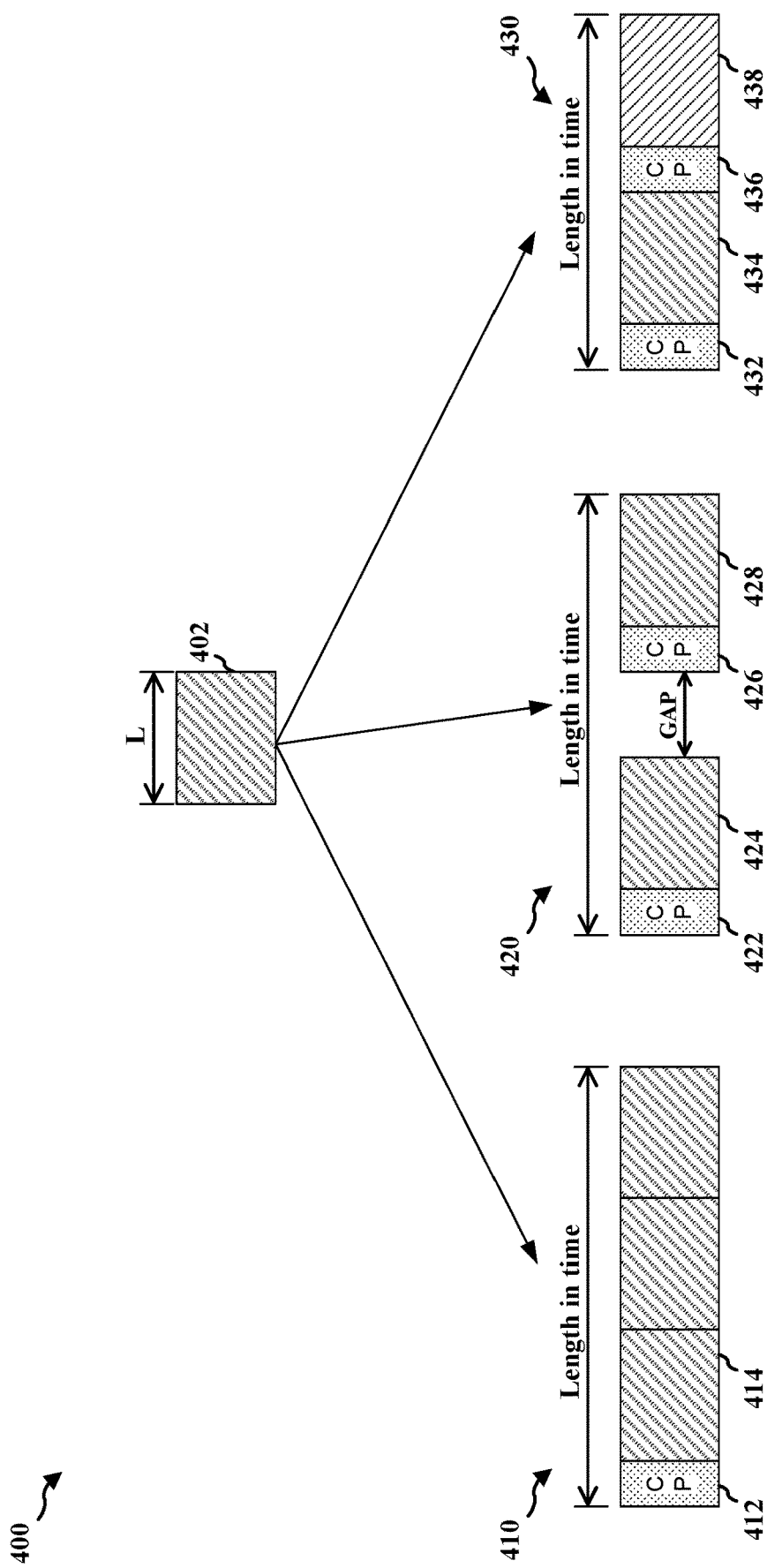
FIG. 4 illustrates example TD RS patterns of a method of wireless communication.

FIG. 4 illustrates example 400 of various TD RS patterns that may be based on a shared base sequence 402. The example 400 illustrates a first set of TD RS occasions 410, a second set of TD RS occasions 420, and a third set of TD RS occasions 430. The set of TD RS occasions may include one or more sequence occasions of length L in time, and the number of occasions may depend on a particular use of the set of TD RS occasions (e.g., whether the TD RS is used for channel estimation, tracking, beam management, etc.) or the quality associated with the particular use of the TD RS. That is, based on the one or more base sequence 402, a set of one or more TD RS occasions may include various patterns of TD RS occasions, and the set of one or more TD RS occasions associated with at least one of a use case or a quality specification of the set of TD RS occasions. The base RS sequence may be based on various types of RS sequences, e.g., Pseudo-Noise (PN) sequence, Walsh sequence, Zadoff-Chu (ZC) sequence, a pair of Golay sequences, among other examples.

In one example, a set of six (6) TD RS occasions may be configured for a channel estimation RS for the PDSCH. In another example, a set of three (3) TD RS occasions may be configured for a channel estimation RS for the PDCCH. In yet another example, one (1) TD RS occasion may be configured for a CSI-RS.

In one aspect, the first set of TD RS occasions 410 may include three contiguous TD RS occasions 414 without a gap and one CP 412. The three contiguous TD RS occasions 414 may include the same RS sequence. For example, the first set of TD RS occasions 410 may be configured for channel estimation for the PDCCH. In another aspect, the second set of TD RS occasions 420 may include two TD RS occasions 424 and 428 with a time gap between the TD RS occasions, and a CP 422 and 426 preceding each TD RS occasion. The two CPs 422 and 426 may be respectively provided in front of the non-contiguous two TD RS occasions 424 and 428. For example, the first TD RS occasion 424 and the second TD RS occasion 428 may carry the same RS sequences transmitted on different beams, and the second set of TD RS occasions 420 may be used for the beam management (BM), e.g., for use as a BM RS. In another aspect, the third set of TD RS occasions 430 may include two TD RS occasions 434 and 438, without a time gap. The first TD RS occasion 434 and the second TD RS occasion 438 may have different RS sequences, and the first CP 432 may be provided prior to the first TD RS occasion 434, and the second CP 436 may be provided between the first TD RS occasion 434 and the second TD RS occasion 438. For example, the third set of TD RS occasions 430 may be configured for use as a channel state information RS (CSI-RS).

In some aspects, a network entity may combine more than one set of TD RS occasions to meet a particular quality specification or for a particular type of use or processing of the one or more TD RS. For example, a UE may perform channel estimation using a TD RS received in a combination of two of the first sets of TD RS occasions 410 to form a set of 6 TD RS occasions.

The same base RS sequence may be repeated in each of the TD RS occasions. Alternatively, different RS sequences may be transmitted in different TD RS occasions. The different RS sequences may include at one or more of a different scrambling, a different base sequence, or shifts relative to the base RS sequence. For example, in the set of TD RS occasions 410, the TD RS may be transmitted in the first TD RS occasion with a first scrambling, in the second TD RS occasion with a second scrambling, and in the third TD RS occasion with a third scrambling. As another example, the TD RS in the in the first TD RS occasion may be transmitted based on the base RS sequence, in the second TD RS occasion, the TD RS may be based on the base RS sequence with a first shift, and the TD RS in the third TD RS occasion may be based on the base RS sequence with a second shift. As another example, in the set of TD RS occasions 420, the TD RS in the first TD RS occasion may be based on a first base sequence, the TD RS in the second TD RS occasion may be based on a second base sequence.

At least one CP may be provided per the set of one or more TD RS occasions. That is, the CP may be configured prior to the set of one or more TD RS occasions. In some aspects, additional CPs may be provided based on including any gap or using different RS sequences in the set of one or more TD RS occasions.

In some aspects, the TD RS occasions in the set of one or more TD RS occasions may be configured contiguously without gaps or non-contiguously with at least one gap between the TD RS occasions. In one aspect, the TD RS occasions in the set of one or more TD RS occasions may be provided continuously without gaps. The contiguously configured TD RS occasions may use the same sequence, and a single CP or a GI may be defined for the set of TD RS occasions. In another aspect, the TD RS occasions in the set of one or more TD RS occasions may be configured non-contiguously with at least one gap between the TD RS occasions. The set of TD RS occasions including the non-contiguously configured TD RS occasions may include the CP and/or guard interval (GI) for each TD RS occasion. In yet another aspect, a gap may be configured between the TD RS occasions that are transmitted on different beams to accommodate the beam switching.

The set of one or more TD RS occasions may be configured to mitigate interference in some aspects. In one aspect, the TD RS in the set of one or more TD RS occasions may be scrambled based on a cell-specific scrambling or a UE-specific scrambling. Furthermore, the scrambling may be randomized in time for interference mitigation. In another aspect, an orthogonal cover code (OCC) may be added on top of multiple occasions. That is, to mitigate a persistent interference, the set of one or more TD RS occasions may be received based on an OCC. The OCC may also be used for multiplexing the signal per user.

In some aspects, the base station may configure at least one set of one or more TD RS occasions for the DL and/or the UL channels/signals, and the base station may transmit the configuration to the UE. In one aspect, the set of one or more TD RS occasions may be configured such that the alignment with a symbol length is maintained. That is, the base station may configure at least one of CP length, RS sequence length, or a number of repeated TD RS occasions, and the configuration of the set of one or more TD RS occasions may be determined so that the set of one or more TD RS occasions may be synchronized with the symbol. For example, the configuration may maintain alignment with a symbol.

In another aspect, the length of the set of one or more TD RS occasions may be determined based on the BW. For example, for a smaller BW, the network entity may process TD RS of a set of TD RS occasions that is longer in the time domain to satisfy the same quality. Accordingly, at least one of the length of the RS sequence in time or the number of repetitions of TD RS may be a function of BW of the corresponding channel/signal. For example, at least one of the lengths of the RS sequence in time or the number of repetitions of TD RS may be an inverse function of the BW of the corresponding channel/signal.

In another aspect, the base station may, in the configuration of at least one set of one or more TD RS occasions, indicate whether the TD RS occasions are phase-coherent, on the same or different beams, or use the same or different ports. In one example, the base station may indicate that a first TD RS occasion and a second TD RS occasion are phase-coherent, and the UE may determine to combine the first TD RS occasion and the second TD RS occasion to meet a particular quality specification or for a particular type of use or processing of the one or more TD RS. In another example, the base station may indicate that the first TD RS occasion and the second TD RS occasion are transmitted on different beams, and the UE may process the first TD RS occasion and the second TD RS occasion on different beams to perform the beam training or management. In yet another example, TD RS occasions using different ports may be processed for the MIMO procedure.

In one aspect, for UL RS, the UE may indicate to the base station that the UE has the capability of processing phase coherency of multiple TD RS occasions. As some UEs may not have the capability to transmit multiple TD RS occasions with phase coherency, the UE may indicate the base station whether the UE has the capability to process multiple TD RS occasions that with the phase coherency.

The configuration of the one or more RS sequence and/or the length of one TD RS occasion may be either indicated by the base station. In some aspects, the configuration of the one or more RS sequence and/or length for the TD RS occasions may be defined, such as in a standard, and known by the UE and the base station. Also, the configuration of the one or more RS sequence and/or the length of one TD RS occasion may be defined for the base station and/or the UE. For example, a specific RS occasion with a small RS specification, e.g., phase tracking RS (PTRS), may be defined to improve the efficiency and reduce the signaling overhead.

In one aspect, the UE may use a subset of the set of one or more TD RS occasions for the desired operation. In another aspect, the UE may use a subset of TD RS occasions in the set of TD RS occasions. For example, a channel estimation RS for PDSCH may contain six (6) TD RS occasions, and the UE may use three (3) TD RS occasions from the channel estimation RS for PDSCH for tracking purposes. Referring to FIG. 4, from the first set of TD RS occasions 410 configured for channel estimation for the PDCCH, a UE may select one TD RS occasion as the CSI-RS.

In some cases, RSs, e.g., CSI-RS, may be either semi-statically configured, i.e., periodic, or dynamically activated via the MAC-CE or the DCI. For example, the MAC-CE may semi-persistently configure/activate the RS and the DCI may configure/activate the RS a-periodically. In one aspect, some RSs, e.g., BM RS, may be configured, and some other RSs may be based on the signaling activity. For example, the PDSCH channel estimation RSs may be sent only when there is a signal transmitting the PDSCH data.

To avoid duplicate use of the TD RS, i.e., unnecessary configuration/activation of multiple RSs, dynamic control of the TD RS occasions may provide improved efficiency and improve the operation precision by indicating which TD RS occasions are active and which TD RS occasions the network entity may omit. In some aspects, multiple TD RSs may be configured, and particular TD RS configurations may be activated or deactivated. The activation/deactivation may be based on current communication, current operation of the UE or base station, one or more antenna ports, one or more beams, etc. In some aspects, the activation/deactivation may be dynamic, which may allow for added control of the TD RS. The dynamic activation and/or deactivation of the TD RSs may be based on multiple factors including the use of the TD RS, available RS grants, available antenna ports, and available beams used to transmit the TD RS occasions. The dynamic control of the set of one or more TD RS occasions may include dynamically changing the number of repetitions of the RS sequence based on the use case and the quality specification. The repetitions of the TD RS may be changed, e.g., in a dynamic manner, so that different RS use may be based on a common base sequence but with different number of repetitions. The dynamic activation/ deactivation of the TD RS occasions may be useful for larger delay applications, e.g., satellite communications. Thus, the aspects presented herein may be used in connection with a non-terrestrial network (NTN).

Figure 5:
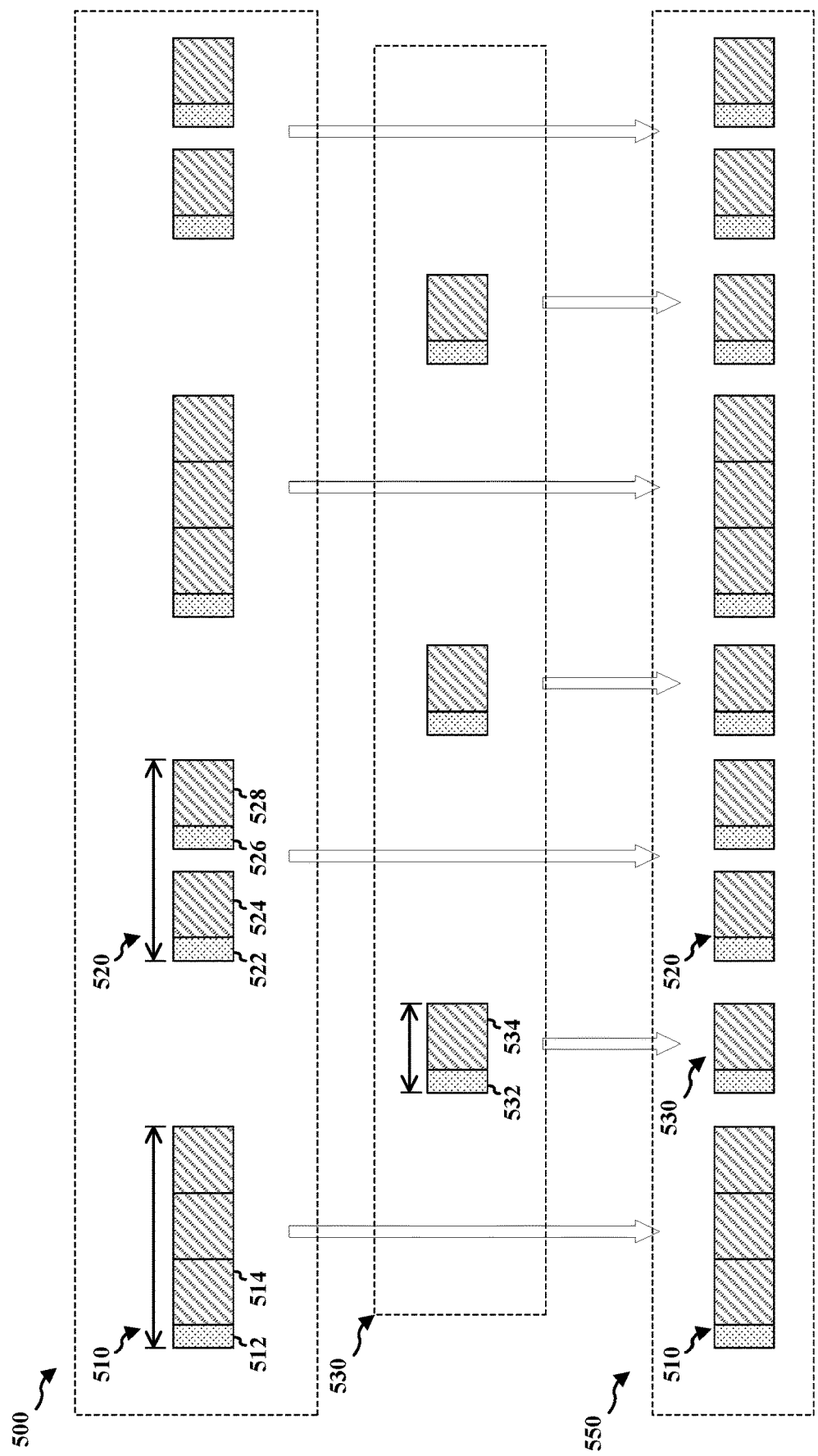
FIG. 5 illustrates examples 500, 530, and 550 of TD RS pattern of a method of wireless communication.

FIG. 5 illustrates examples 500, 530, and 550 of TD RS pattern of a method of wireless communication. That is, FIG. 5 illustrates a first pattern 500 of the one or more TD RS occasions and a second pattern 530 of the one or more TD RS occasions. The pattern of the one or more TD RS occasions may include one or more set of TD RS occasions. The first pattern 500 may include a first set of TD RS occasions 510 including three contiguous TD RS occasions 514 without a gap and one CP 512 and a second set of TD RS occasions 520 including two TD RS occasions 524 and 528 with a gap in between, and two CPs 522 and 526. The second pattern 530 may include one TD RS occasion 534 and one CP 532.

The third pattern 550 of the one or more TD RS occasions illustrates the TD RS pattern when both of the first pattern 500 and the second pattern 530 are activated. That is, the third pattern 550 may include the first set of the one or more TD RS occasions 510 and the second set of TD RS occasions 520 of the first pattern 500 and the single TD RS occasion 534 of the second pattern 530. The first pattern 500 and the second pattern 530 do not overlap with each other.

The base station may send to the UE a configuration of at last one pattern of TD RS occasions. The base station may transmit an indication for the UE to use the previously configured TD RS pattern of an upcoming one or more RS occasions DL signal and/or UL signal. In some aspects, the base station may transmit the configuration of the TD RS pattern(s) in RRC signaling. The base station may transmit the indication to use a configured TD RS pattern in at least one RRC, MAC-CE, or DCI. The configuration of the at least one pattern of the one or more TD RS occasions may include a number of upcoming symbols/slots, a number and distribution of the TD RS occasions, the use case of the set of the one or more TD RS occasions, the format of the TD RS occasions, periodicity of the set of one or more TD RS occasions, or TCI state, beam configuration, or ports of the TD RS occasions. In one example, the use case of the set of the one or more TD RS occasions may indicate that the set of the one or more TD RS occasions is for channel estimation, beam management, tracking, etc. In another example, the format of the TD RS occasions may indicate the length of the RS sequence, the number of repetitions of the TD RS occasions per set of the one or more TD RS occasions, or the CP configuration.

The configuration of at least one pattern of one or more TD RS occasions may include more than one pattern of one or more TD RS occasions. In one aspect, one of the more than one patterns of one or more TD RS occasions may be configured as the default pattern. The default pattern may refer to the pattern of the one or more TD RS occasions that the network entity may fallback to when that is no other pattern of the one or more TD RS occasions is configured.

In some aspects, more than one pattern of the one or more TD RS occasions may include at least one TD RS occasions that overlap in time. That is, the base station may activate more than one pattern of the one or more TD RS occasions, including a first pattern and a second pattern, and the first pattern may include at least one TD RS occasions that overlap with at least a part of the second pattern in time. The UE may follow various rules in response to the overlapping TD RS occasions in the more than one pattern of the one or more TD RS occasions. The rules may be configured by the base station or may be defined. In one aspect, the UE may assume a superset, i.e., a union, of the active patterns.

In another aspect, the UE may assume that one of the overlapping TD RS occasions is activated and the other is deactivated. For example, in case a default pattern overlaps with another pattern, the UE may assume that the default pattern is activated and the part of the other pattern that overlaps with the default pattern may be assumed deactivated. In another aspect, the network including the base station or a defined rule, may define in case a collision between different RSs. For example, when channel estimation RS collides with another RS, the UE may assume that the channel estimation RS is activated and the other RS is deactivated.

In another aspect, the base station may transmit an indication of a deactivation pattern. That is, the base station may configure a pattern of deactivation that may function as a mask and transmit the pattern of the deactivation to the UE. The UE may receive the indication of a deactivation pattern from the base station, and the UE may deactivate the part of the TD RS pattern that overlaps with the mask.

The base station may also configure the number of repetitions of the TD RS pattern. That is, the TD RS configuration pattern may be configured for once, repeated for more than once, or repeated indefinitely, i.e., until receiving a further change/deactivation of the TD RS pattern.

In one aspect, the indication may be configured cell-specific or UE-specific. That is, in case a group of UEs in a cell receives a group-common indication, the indication may indicate for each of the UEs in the group served by the cell to activate/deactivate the TD RS configuration.

Figure 6:
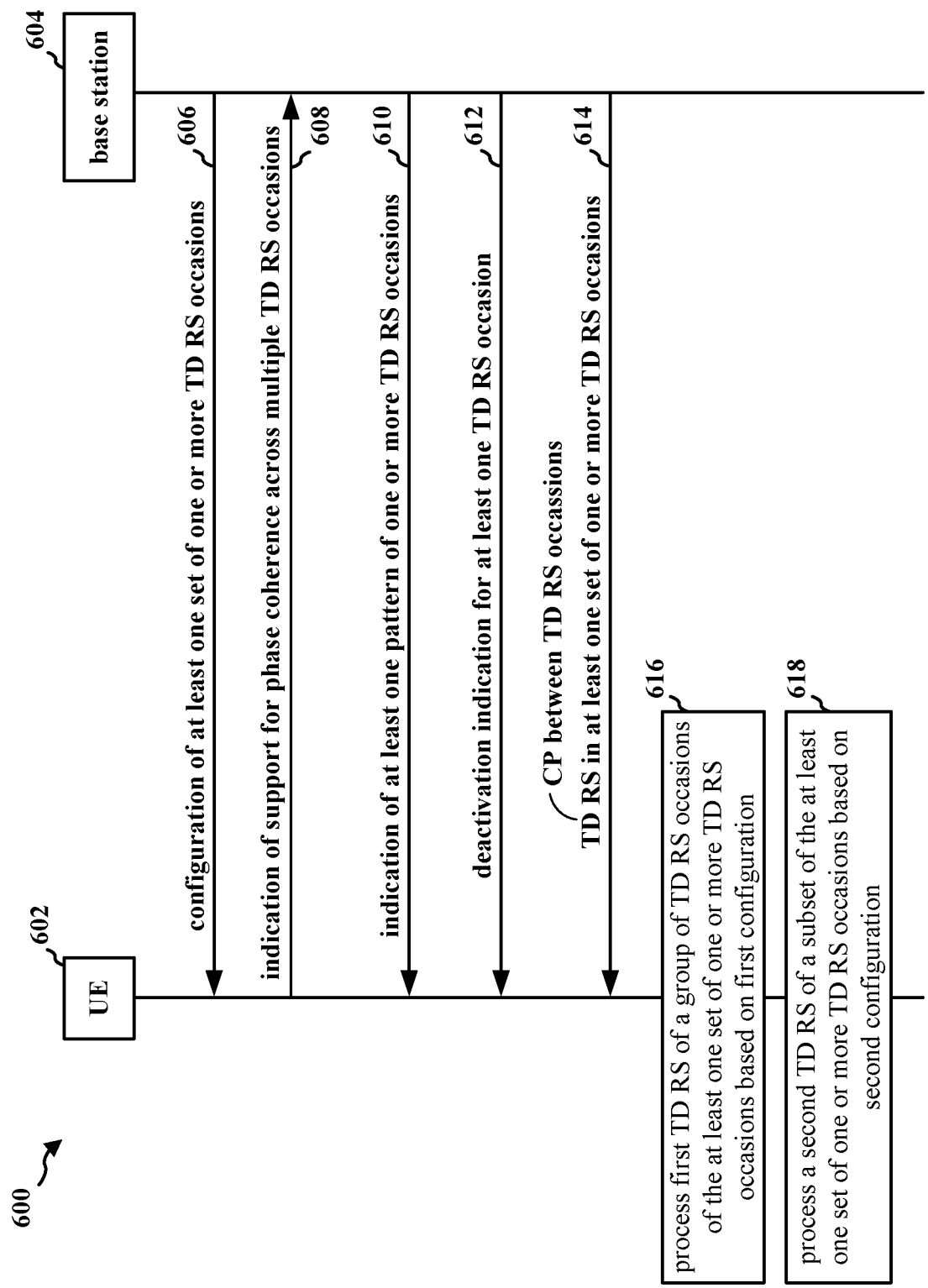
FIG. 6 is a communication diagram 600 of a method of wireless communication.

FIG. 6 is a communication diagram 600 of a method of wireless communication. The communication diagram 600 may include a UE 602 and a base station 604. The base station 604 may be part of a terrestrial network. The base station 604 may be part of an NTN. The base station 604 may transmit a configuration of at least one set of one or more TD RS occasion and an indication of the at least one pattern of one or more TD RS occasions to the UE 602, and the UE 602 may receive a TD RS in at least one set of the one or more TD RS occasions.

At 606, the base station 604 may transmit at least one configuration of at least one set of one or more TD RS occasions associated with at least one type of reference signal measurement to the UE 602, and the UE 602 may receive the at least one configuration of the at least one set of one or more TD RS occasions associated with the at least one type of reference signal measurement. Here, the type of reference signal measurement may be a particular measurement, e.g., channel estimation, tracking, beam management, etc. or may refer to a quality level for the measurement. In some aspects, the configuration may be transmitted in RRC signaling to the UE 602.

In some aspects, the at least one configuration of the at least one set of one or more TD RS occasions may include at least one of a length of the TD RS occasions or a number of TD RS occasions in the at least one set of one or more TD RS occasions is based on a bandwidth of the TD RS occasions. In one aspect, a length of a set of one or more TD RS occasions may be determined based on alignment with a symbol. The length of the set of TD RS occasions may be based on one or more of a cyclic prefix length, a sequence length, or a number of TD RS occasions in the set of TD RS occasions. In another aspect, the at least one configuration of the at least one set of one or more TD RS occasions may include at least one of a phase coherency, beam configuration, or port configuration for the one or more TD RS occasions. In another aspect, the at least one configuration of the at least one set of one or more TD RS occasions may include at least one of a reference signal sequence or a TD RS occasion length for the one or more TD RS occasions. Also, at least one of a reference signal sequence or a TD RS occasion length for the one or more TD RS occasions may be defined.

At 608, the UE 602 may transmit an indication of support for phase coherence across multiple TD RS occasions, and the base station 604 may receive the indication of support for phase coherence across multiple TD RS occasions. As some UEs may not have the capability to transmit multiple TD RS occasions with phase coherency, the UE 602 may indicate the base station 604 whether the UE 602 has the capability to process multiple TD RS occasions that with the phase coherency.

At 610, the base station 604 may transmit an indication of at least one pattern of the one or more TD RS occasions activating the at least one pattern of the one or more TD RS occasions, and the UE 602 may receive the indication of at least one pattern of the one or more TD RS occasions activating the at least one pattern of the one or more TD RS occasion. Here, the TD RS is received at least one set of one or more TD RS occasions based on one or more of the at least one pattern of the one or more TD RS occasions. For example, the UE 602 may receive the activation indication in RRC signaling, a MAC-CE, or a DCI from the base station 604.

In one aspect, the at least one pattern of the one or more TD RS occasions may include a default pattern of the one or more TD RS occasions. In some aspects, when the indication of the at least one pattern of the one or more TD RS occasions includes a first pattern of a first set of one or more TD RS occasions and a second pattern of a second set of one or more TD RS occasions, the TD RS may be received based on a union of the first pattern of the first set of one or more TD RS occasions and the second pattern of the second set of one or more TD RS occasions. In another aspect, when at least a part of the second pattern collide with the first pattern, the TD RS is received based on one of the first pattern or the second pattern. The one of the first pattern and the second pattern may be determined based on the type of the first set of one or more TD RS occasions and a type of the second set of one or more TD RS occasions.

In some aspects, the indication of the at least one pattern of the one or more TD RS occasions may include a time duration for repeating the at least one pattern of the one or more TD RS occasions. In another aspect, the indication of the at least one pattern of the one or more TD RS occasions may be cell-specific or UE-specific.

At 612, the base station 604 may transmit a deactivation indication for at least one TD RS occasion in the at least one pattern of the one or more TD RS occasions, and the UE 602 may receive the deactivation indication for at least one TD RS occasion in the at least one pattern of the one or more TD RS occasions. For example, the deactivation may be indicated in RRC signaling, a MAC-CE, or a DCI from the base station 604. The base station 604 may dynamically activate or deactivate one or more of the TD RSs that were previously configured for the UE 602.

At 614, the base station 604 may transmit one or more TD RS in the at least one set of one or more TD RS occasions based on the at least one configuration of the at least one set of one or more TD RS occasions, and the UE 602 may receive the one or more TD RS in the at least one set of one or more TD RS occasions based on the at least one configuration of the at least one set of one or more TD RS occasions.

In one aspect, the RS sequence of the TD RS occasions may include the same base sequence. In another aspect, the one or more TD RS occasions may include a first TD RS occasion and a second TD RS occasion, and the TD RS in the second TD RS occasion may include at least one of a different scrambling, a different base sequence, or a shifts relative to the TD RS received in a first TD RS occasion. The TD RS occasions may include a CP between the first TD RS occasion and the second TD RS occasion.

In some aspects, the TD RS occasions may be configured contiguously or non-contiguously. In one aspect, the at least one set of one or more TD RS occasions may include a subset of one or more TD RS occasions that are contiguous in time. In such case, each TD RS occasion of the subset of one or more TD RS occasions may include same base sequence, and the subset of one or more TD RS occasions may include at least one of a single CP or a single GI. In another aspect, the one or more TD RS occasions are non-contiguous in time, and the at least one set of one or more TD RS occasions comprises at least one of a CP or a GI provided between each TD RS occasion of the one or more TD RS occasions. The at least one set of one or more TD RS occasions may also include a time gap for beam switching.

In one aspect, the TD RS may be scrambled in the at least one set of one or more TD RS occasions based on a cell-specific scrambling or a UE-specific scrambling. In another aspect, the at least one set of one or more TD RS occasions is received based on an OCC.

At 616, the UE 602 may process a first TD RS in a group of TD RS occasions of the at least one set of one or more TD RS occasions based on a first configuration of the at least one configuration. Here, the group of TD RS occasions may include more than one sets of one or more TD RS occasions. That is, the UE 602 may combine two sets of TD RS occasions for processing. For example, the UE 602 may combine two TD RS occasions for channel estimation of PDCCH to generate a set of TD RS occasions for PDSCH.

At 618, the UE 602 may process a second TD RS in a subset of the at least one set of one or more TD RS occasions based on a second configuration of the at least one configuration. That is, the UE 602 may use a subset of the set of one or more TD RS occasions for the desired operation. For example, the UE 602 may take the TD RS occasions for the PDCCH and use one TD RS occasion for CSI-RS.

Figure 7:
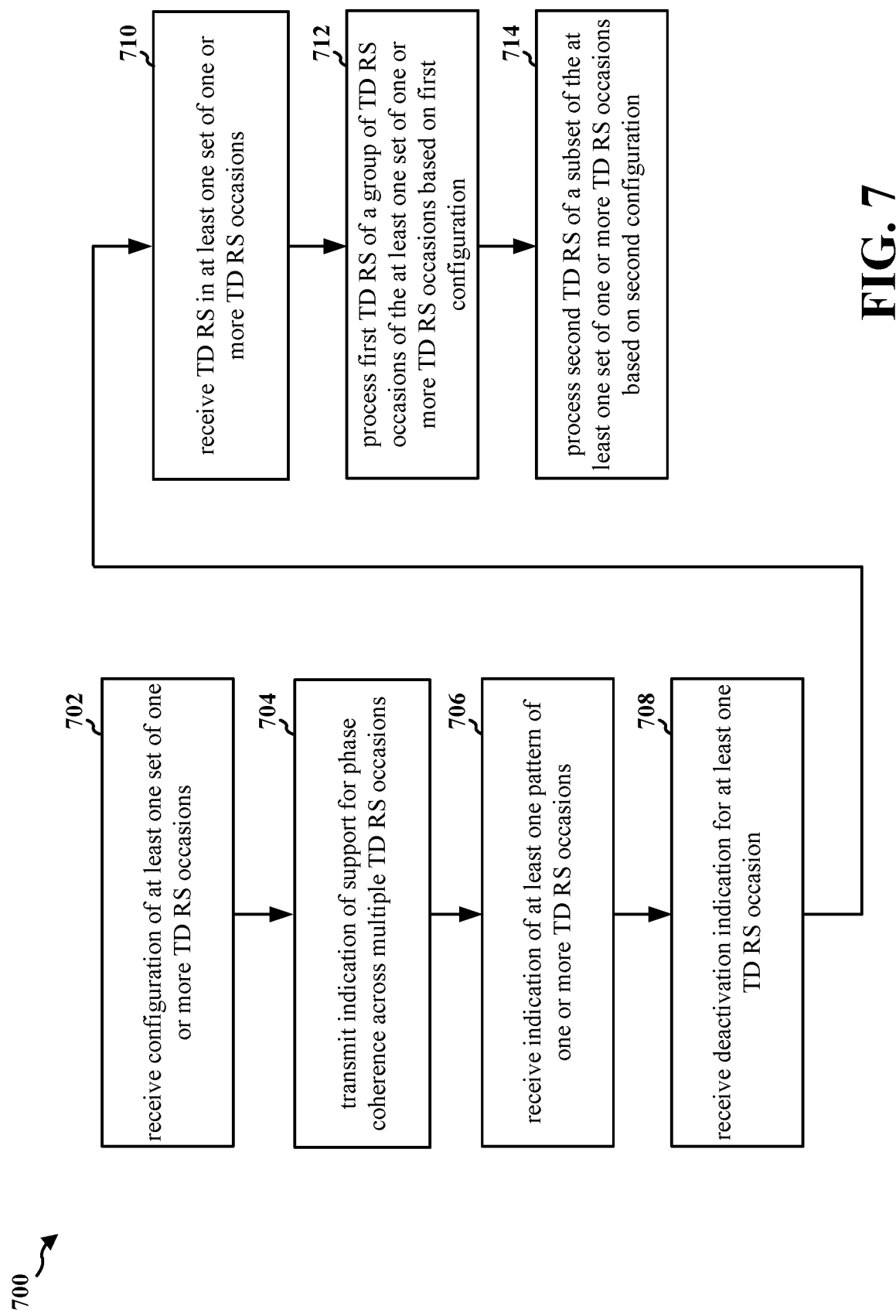
FIG. 7 is a flowchart of a method of wireless communication.

FIG. 7 is a flowchart 700 of a method of wireless communication. The method may be performed by a UE (e.g., the UE 104/602; the apparatus 1102). The UE may receive a configuration of at least one set of one or more TD RS occasion and an indication of the at least one pattern of one or more TD RS occasions from a base station, and the UE may receive a TD RS in at least one set of the one or more TD RS occasions.

At 702, the UE may receive the at least one configuration of the at least one set of one or more TD RS occasions associated with the at least one type of reference signal measurement. Here, the type of reference signal measurement may be a particular measurement, e.g., channel estimation, tracking, beam management, etc. or may refer to a quality level for the measurement. In some aspects, the configuration may be received in RRC signaling from the base station. For example, at 606 of FIG. 6, the UE 602 may receive, from the base station 604, the at least one configuration of the at least one set of one or more TD RS occasions associated with the at least one type of reference signal measurement. Furthermore, 702 may be performed by a scalable TD RS occasion configuring component 1140.

In some aspects, the at least one configuration of the at least one set of one or more TD RS occasions may include at least one of a length of the TD RS occasions or a number of TD RS occasions in the at least one set of one or more TD RS occasions is based on a bandwidth of the TD RS occasions. In one aspect, a length of a set of one or more TD RS occasions may be determined based on alignment with a symbol. The length of the set of TD RS occasions may be based on one or more of a cyclic prefix length, a sequence length, or a number of TD RS occasions in the set of TD RS occasions. In another aspect, the at least one configuration of the at least one set of one or more TD RS occasions may include at least one of a phase coherency, beam configuration, or port configuration for the one or more TD RS occasions. In another aspect, the at least one configuration of the at least one set of one or more TD RS occasions may include at least one of a reference signal sequence or a TD RS occasion length for the one or more TD RS occasions. Also, at least one of a reference signal sequence or a TD RS occasion length for the one or more TD RS occasions may be defined.

At 704, the UE may transmit an indication of support for phase coherence across multiple TD RS occasions. Some UEs may not have the capability to transmit multiple TD RS occasions with phase coherency, and the UE may indicate the base station whether the UE has the capability to process multiple TD RS occasions that with the phase coherency. For example, at 608 of FIG. 6, the UE 602 may transmit, to the base station 604, an indication of support for phase coherence across multiple TD RS occasions. Furthermore, 704 may be performed by the scalable TD RS occasion configuring component 1140.

At 706, the UE may receive an indication of at least one pattern of the one or more TD RS occasions activating the at least one pattern of the one or more TD RS occasion. Here, the TD RS is received at least one set of one or more TD RS occasions based on one or more of the at least one pattern of the one or more TD RS occasions. For example, the UE may receive the activation indication in RRC signaling, a MAC-CE, or a DCI from the base station. For example, at 610 of FIG. 6, the UE 602 may receive, from the base station 604, the indication of at least one pattern of the one or more TD RS occasions activating the at least one pattern of the one or more TD RS occasion. Furthermore, 706 may be performed by a dynamic TD RS activation/deactivation component 1142.

In one aspect, the at least one pattern of the one or more TD RS occasions may include a default pattern of the one or more TD RS occasions. In some aspects, when the indication of the at least one pattern of the one or more TD RS occasions includes a first pattern of a first set of one or more TD RS occasions and a second pattern of a second set of one or more TD RS occasions, the TD RS may be received based on a union of the first pattern of the first set of one or more TD RS occasions and the second pattern of the second set of one or more TD RS occasions. In another aspect, when at least a part of the second pattern collide with the first pattern, the TD RS is received based on one of the first pattern or the second pattern. The one of the first pattern and the second pattern may be determined based on the type of the first set of one or more TD RS occasions and a type of the second set of one or more TD RS occasions.

In some aspects, the indication of the at least one pattern of the one or more TD RS occasions may include a time duration for repeating the at least one pattern of the one or more TD RS occasions. In another aspect, the indication of the at least one pattern of the one or more TD RS occasions may be cell-specific or UE-specific.

At 708, the UE may receive the deactivation indication for at least one TD RS occasion in the at least one pattern of the one or more TD RS occasions. For example, the deactivation may be indicated in RRC signaling, a MAC-CE, or a DCI from the base station. The base station may dynamically activate or deactivate one or more of the TD RSs that were previously configured for the UE. For example, at 612 of FIG. 6, the UE 602 may receive, from the base station 604, the deactivation indication for at least one TD RS occasion in the at least one pattern of the one or more TD RS occasions. Furthermore, 708 may be performed by the dynamic TD RS activation/deactivation component 1142.

At 710, the UE may receive the one or more TD RS in the at least one set of one or more TD RS occasions based on the at least one configuration of the at least one set of one or more TD RS occasions. For example, at 614 of FIG. 6, the UE 602 may receive, from the base station 604, the one or more TD RS in the at least one set of one or more TD RS occasions based on the at least one configuration of the at least one set of one or more TD RS occasions. Furthermore, 710 may be performed by a scalable TD RS occasion processing component 1144.

In one aspect, the RS sequence of the TD RS occasions may include the same base sequence. In another aspect, the one or more TD RS occasions may include a first TD RS occasion and a second TD RS occasion, and the TD RS in the second TD RS occasion may include at least one of a different scrambling, a different base sequence, or a shifts relative to the TD RS received in a first TD RS occasion. The TD RS occasions may include a CP between the first TD RS occasion and the second TD RS occasion.

In some aspects, the TD RS occasions may be configured contiguously or non-contiguously. In one aspect, the at least one set of one or more TD RS occasions may include a subset of one or more TD RS occasions that are contiguous in time. In such case, each TD RS occasion of the subset of one or more TD RS occasions may include same base sequence, and the subset of one or more TD RS occasions may include at least one of a single CP or a single GI. In another aspect, the one or more TD RS occasions are non-contiguous in time, and the at least one set of one or more TD RS occasions comprises at least one of a CP or a GI provided between each TD RS occasion of the one or more TD RS occasions. The at least one set of one or more TD RS occasions may also include a time gap for beam switching.

In one aspect, the TD RS may be scrambled in the at least one set of one or more TD RS occasions based on a cell-specific scrambling or a UE-specific scrambling. In another aspect, the at least one set of one or more TD RS occasions is received based on an OCC.

At 712, the UE may process a first TD RS in a group of TD RS occasions of the at least one set of one or more TD RS occasions based on a first configuration of the at least one configuration. Here, the group of TD RS occasions may include more than one sets of one or more TD RS occasions. That is, the UE may combine two sets of TD RS occasions for processing. For example, the UE may combine two TD RS occasions for channel estimation of PDCCH to generate a set of TD RS occasions for PDSCH. For example, at 616 of FIG. 6, the UE 602 may process a first TD RS in a group of TD RS occasions of the at least one set of one or more TD RS occasions based on a first configuration of the at least one configuration. Furthermore, 712 may be performed by the scalable TD RS occasion processing component 1144.

At 714, the UE may process a second TD RS in a subset of the at least one set of one or more TD RS occasions based on a second configuration of the at least one configuration. That is, the UE 602 may use a subset of the set of one or more TD RS occasions for the desired operation. For example, the UE may take the TD RS occasions for the PDCCH and use one TD RS occasion for CSI-RS. For example, at 618 of FIG. 6, the UE 602 may process a second TD RS in a subset of the at least one set of one or more TD RS occasions based on a second configuration of the at least one configuration. Furthermore, 714 may be performed by the scalable TD RS occasion processing component 1144.

Figure 8:
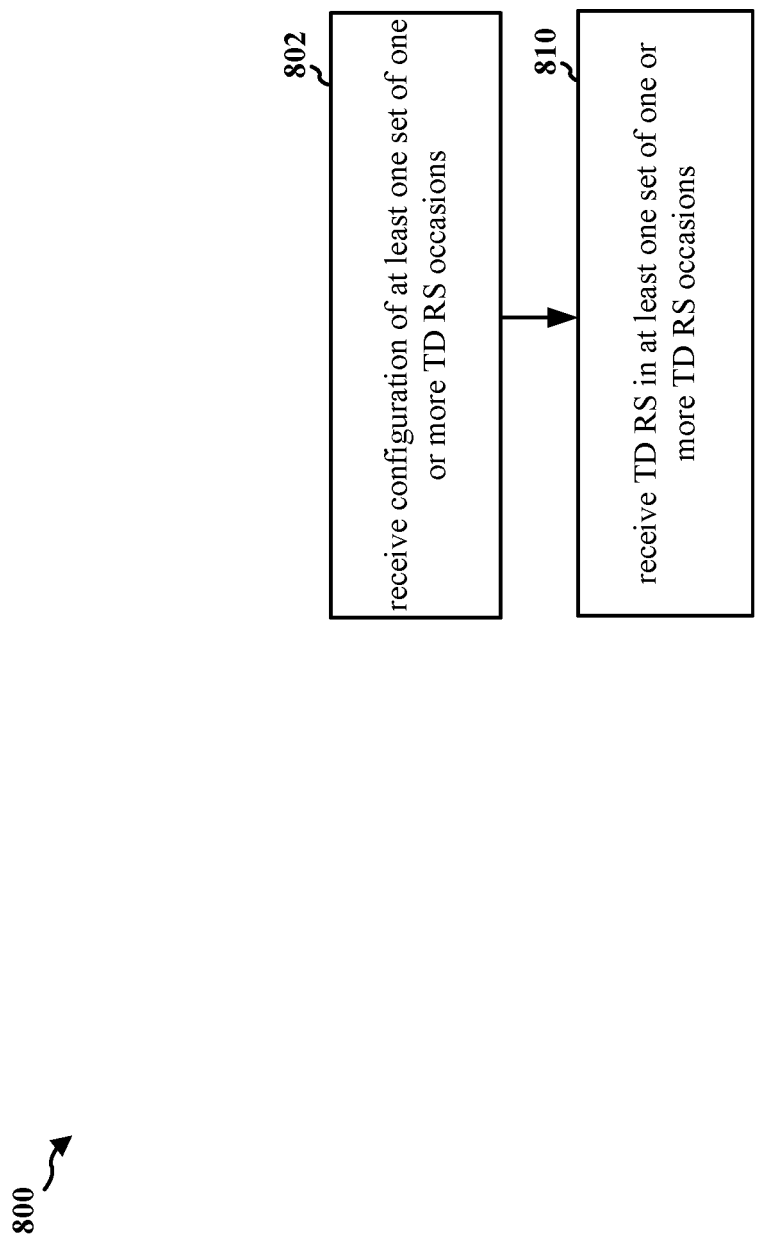
FIG. 8 is a flowchart of a method of wireless communication.

FIG. 8 is a flowchart 800 of a method of wireless communication. The method may be performed by a UE (e.g., the UE 104/602; the apparatus 1102). The UE may receive a configuration of at least one set of one or more TD RS occasion and an indication of the at least one pattern of one or more TD RS occasions from a base station, and the UE may receive a TD RS in at least one set of the one or more TD RS occasions.

At 802, the UE may receive the at least one configuration of the at least one set of one or more TD RS occasions associated with the at least one type of reference signal measurement. Here, the type of reference signal measurement may be a particular measurement, e.g., channel estimation, tracking, beam management, etc. or may refer to a quality level for the measurement. In some aspects, the configuration may be received in RRC signaling from the base station. For example, at 606 of FIG. 6, the UE 602 may receive, from the base station 604, the at least one configuration of the at least one set of one or more TD RS occasions associated with the at least one type of reference signal measurement. Furthermore, 802 may be performed by a scalable TD RS occasion configuring component 1140.

In some aspects, the at least one configuration of the at least one set of one or more TD RS occasions may include at least one of a length of the TD RS occasions or a number of TD RS occasions in the at least one set of one or more TD RS occasions is based on a bandwidth of the TD RS occasions. In one aspect, a length of a set of one or more TD RS occasions may be determined based on alignment with a symbol. The length of the set of TD RS occasions may be based on one or more of a cyclic prefix length, a sequence length, or a number of TD RS occasions in the set of TD RS occasions. In another aspect, the at least one configuration of the at least one set of one or more TD RS occasions may include at least one of a phase coherency, beam configuration, or port configuration for the one or more TD RS occasions. In another aspect, the at least one configuration of the at least one set of one or more TD RS occasions may include at least one of a reference signal sequence or a TD RS occasion length for the one or more TD RS occasions. Also, at least one of a reference signal sequence or a TD RS occasion length for the one or more TD RS occasions may be defined.

At 810, the UE may receive the one or more TD RS in the at least one set of one or more TD RS occasions based on the at least one configuration of the at least one set of one or more TD RS occasions. For example, at 614 of FIG. 6, the UE 602 may receive, from the base station 604, the one or more TD RS in the at least one set of one or more TD RS occasions based on the at least one configuration of the at least one set of one or more TD RS occasions. Furthermore, 810 may be performed by a scalable TD RS occasion processing component 1144.

In one aspect, the RS sequence of the TD RS occasions may include the same base sequence. In another aspect, the one or more TD RS occasions may include a first TD RS occasion and a second TD RS occasion, and the TD RS in the second TD RS occasion may include at least one of a different scrambling, a different base sequence, or a shifts relative to the TD RS received in a first TD RS occasion. The TD RS occasions may include a CP between the first TD RS occasion and the second TD RS occasion.

In some aspects, the TD RS occasions may be configured contiguously or non-contiguously. In one aspect, the at least one set of one or more TD RS occasions may include a subset of one or more TD RS occasions that are contiguous in time. In such case, each TD RS occasion of the subset of one or more TD RS occasions may include same base sequence, and the subset of one or more TD RS occasions may include at least one of a single CP or a single GI. In another aspect, the one or more TD RS occasions are non-contiguous in time, and the at least one set of one or more TD RS occasions comprises at least one of a CP or a GI provided between each TD RS occasion of the one or more TD RS occasions. The at least one set of one or more TD RS occasions may also include a time gap for beam switching.

In one aspect, the TD RS may be scrambled in the at least one set of one or more TD RS occasions based on a cell-specific scrambling or a UE-specific scrambling. In another aspect, the at least one set of one or more TD RS occasions is received based on an OCC.

Figure 9:
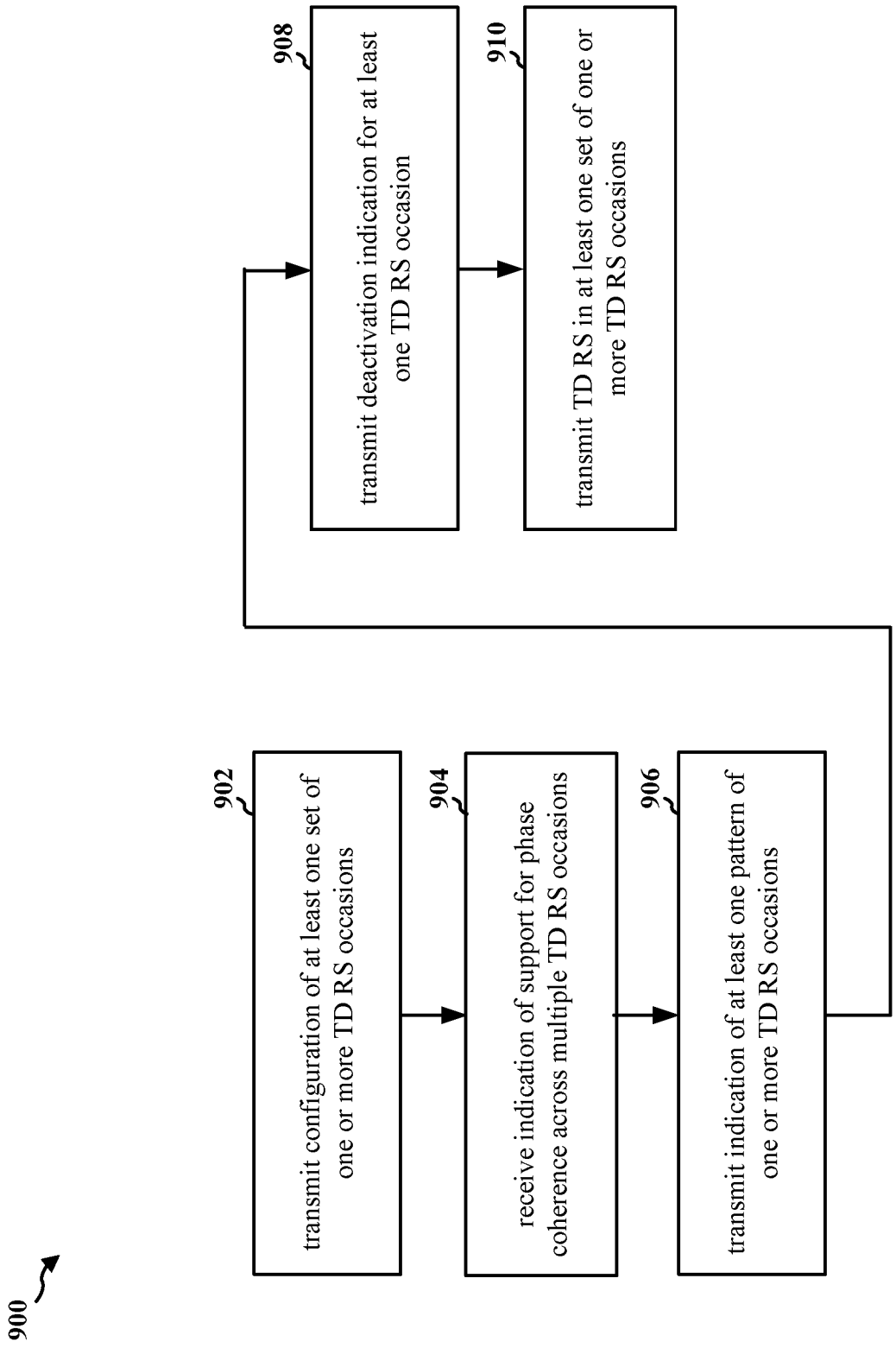
FIG. 9 is a flowchart of a method of wireless communication.

FIG. 9 is a flowchart 900 of a method of wireless communication. The method may be performed by a base station (e.g., the base station 102/180/604; the apparatus 1202). The base station may transmit a configuration of at least one set of one or more TD RS occasion and an indication of the at least one pattern of one or more TD RS occasions to a UE, and the base station may transmit a TD RS in at least one set of the one or more TD RS occasions.

At 902, the base station may transmit at least one configuration of at least one set of one or more TD RS occasions associated with at least one type of reference signal measurement to a UE. Here, the type of reference signal measurement may be a particular measurement, e.g., channel estimation, tracking, beam management, etc. or may refer to a quality level for the measurement. In some aspects, the configuration may be transmitted in RRC signaling to the UE. For example, at 606 of FIG. 6, the base station 604 may transmit, to the UE 602, at least one configuration of at least one set of one or more TD RS occasions associated with at least one type of reference signal measurement. Furthermore, 902 may be performed by a scalable TD RS occasion configuring component 1240.

In some aspects, the at least one configuration of the at least one set of one or more TD RS occasions may include at least one of a length of the TD RS occasions or a number of TD RS occasions in the at least one set of one or more TD RS occasions is based on a bandwidth of the TD RS occasions. In one aspect, a length of a set of one or more TD RS occasions may be determined based on alignment with a symbol. The length of the set of TD RS occasions may be based on one or more of a cyclic prefix length, a sequence length, or a number of TD RS occasions in the set of TD RS occasions. In another aspect, the at least one configuration of the at least one set of one or more TD RS occasions may include at least one of a phase coherency, beam configuration, or port configuration for the one or more TD RS occasions. In another aspect, the at least one configuration of the at least one set of one or more TD RS occasions may include at least one of a reference signal sequence or a TD RS occasion length for the one or more TD RS occasions. Also, at least one of a reference signal sequence or a TD RS occasion length for the one or more TD RS occasions may be defined.

At 904, the base station may receive the indication of support for phase coherence across multiple TD RS occasions. Some UEs may not have the capability to transmit multiple TD RS occasions with phase coherency, and the UE may indicate the base station whether the UE has the capability to process multiple TD RS occasions that with the phase coherency. For example, at 608 of FIG. 6, the base station 604 may receive, from the UE 602, the indication of support for phase coherence across multiple TD RS occasions. Furthermore, 904 may be performed by the scalable TD RS occasion configuring component 1240.

At 906, the base station may transmit an indication of at least one pattern of the one or more TD RS occasions activating the at least one pattern of the one or more TD RS occasions. Here, the TD RS is received at least one set of one or more TD RS occasions based on one or more of the at least one pattern of the one or more TD RS occasions. For example, the UE may receive the activation indication in RRC signaling, a MAC-CE, or a DCI from the base station. For example, at 610 of FIG. 6, the base station 604 may transmit, to the UE 602, the indication of at least one pattern of the one or more TD RS occasions activating the at least one pattern of the one or more TD RS occasions. Furthermore, 906 may be performed by a dynamic TD RS activation/deactivation component 1242.

In one aspect, the at least one pattern of the one or more TD RS occasions may include a default pattern of the one or more TD RS occasions. In some aspects, when the indication of the at least one pattern of the one or more TD RS occasions includes a first pattern of a first set of one or more TD RS occasions and a second pattern of a second set of one or more TD RS occasions, the TD RS may be received based on a union of the first pattern of the first set of one or more TD RS occasions and the second pattern of the second set of one or more TD RS occasions. In another aspect, when at least a part of the second pattern collide with the first pattern, the TD RS is received based on one of the first pattern or the second pattern. The one of the first pattern and the second pattern may be determined based on the type of the first set of one or more TD RS occasions and a type of the second set of one or more TD RS occasions.

In some aspects, the indication of the at least one pattern of the one or more TD RS occasions may include a time duration for repeating the at least one pattern of the one or more TD RS occasions. In another aspect, the indication of the at least one pattern of the one or more TD RS occasions may be cell-specific or UE-specific.

At 908, the base station may transmit a deactivation indication for at least one TD RS occasion in the at least one pattern of the one or more TD RS occasions. For example, the deactivation may be indicated in RRC signaling, a MAC-CE, or a DCI from the base station. The base station may dynamically activate or deactivate one or more of the TD RSs that were previously configured for the UE. For example, at 612 of FIG. 6, the base station 604 may transmit, to the UE 602, a deactivation indication for at least one TD RS occasion in the at least one pattern of the one or more TD RS occasions. Furthermore, 908 may be performed by the dynamic TD RS activation/deactivation component 1242.

At 910, the base station may transmit one or more TD RS in the at least one set of one or more TD RS occasions based on the at least one configuration of the at least one set of one or more TD RS occasions. For example, at 614 of FIG. 6, the base station 604 may transmit, to the UE 602, one or more TD RS in the at least one set of one or more TD RS occasions based on the at least one configuration of the at least one set of one or more TD RS occasions. Furthermore, 910 may be performed by a scalable TD RS occasion transmission component 1244.

In one aspect, the RS sequence of the TD RS occasions may include the same base sequence. In another aspect, the one or more TD RS occasions may include a first TD RS occasion and a second TD RS occasion, and the TD RS in the second TD RS occasion may include at least one of a different scrambling, a different base sequence, or a shifts relative to the TD RS received in a first TD RS occasion. The TD RS occasions may include a CP between the first TD RS occasion and the second TD RS occasion.

In some aspects, the TD RS occasions may be configured contiguously or non-contiguously. In one aspect, the at least one set of one or more TD RS occasions may include a subset of one or more TD RS occasions that are contiguous in time. In such case, each TD RS occasion of the subset of one or more TD RS occasions may include same base sequence, and the subset of one or more TD RS occasions may include at least one of a single CP or a single GI. In another aspect, the one or more TD RS occasions are non-contiguous in time, and the at least one set of one or more TD RS occasions comprises at least one of a CP or a GI provided between each TD RS occasion of the one or more TD RS occasions. The at least one set of one or more TD RS occasions may also include a time gap for beam switching.

In one aspect, the TD RS may be scrambled in the at least one set of one or more TD RS occasions based on a cell-specific scrambling or a UE-specific scrambling. In another aspect, the at least one set of one or more TD RS occasions is received based on an OCC.

Figure 10:
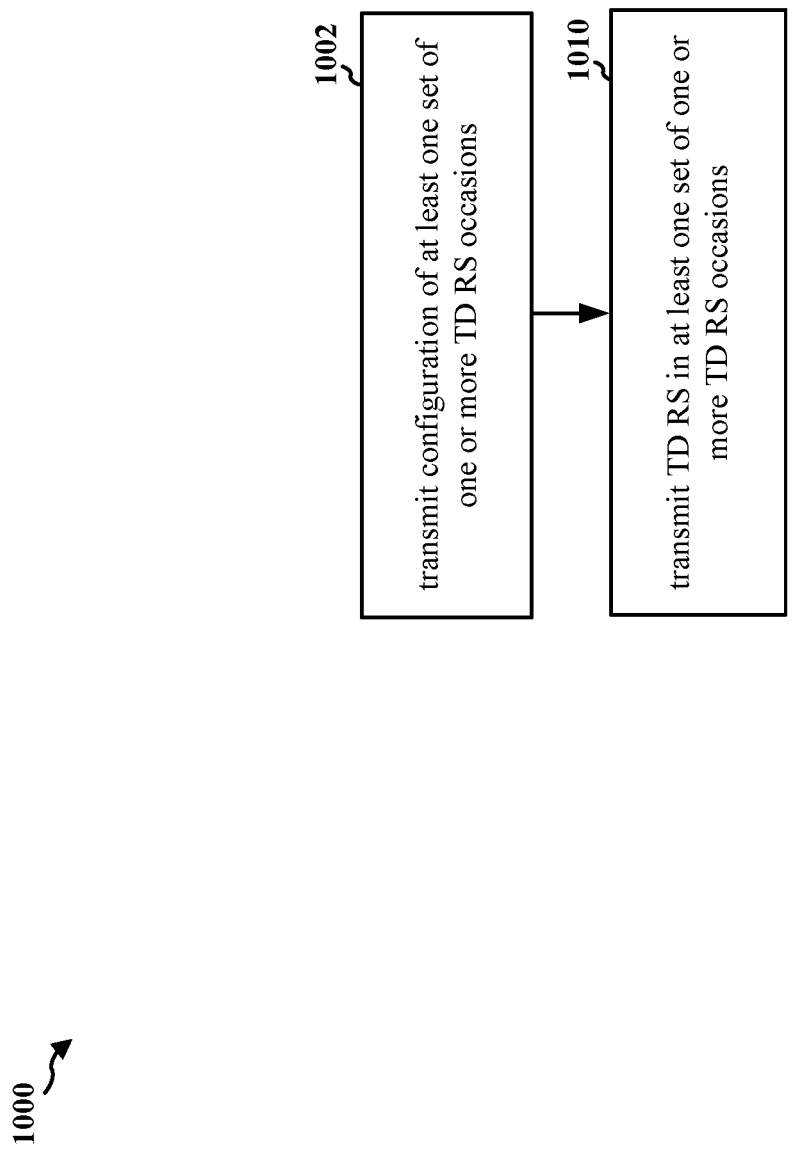
FIG. 10 is a flowchart of a method of wireless communication.

FIG. 10 is a flowchart 1000 of a method of wireless communication. The method may be performed by a base station (e.g., the base station 102/180/604; the apparatus 1202). The base station may transmit a configuration of at least one set of one or more TD RS occasion and an indication of the at least one pattern of one or more TD RS occasions to a UE, and the base station may transmit a TD RS in at least one set of the one or more TD RS occasions.

At 1002, the base station may transmit at least one configuration of at least one set of one or more TD RS occasions associated with at least one type of reference signal measurement to a UE. Here, the type of reference signal measurement may be a particular measurement, e.g., channel estimation, tracking, beam management, etc. or may refer to a quality level for the measurement. In some aspects, the configuration may be transmitted in RRC signaling to the UE. For example, at 606 of FIG. 6, the base station 604 may transmit, to the UE 602, at least one configuration of at least one set of one or more TD RS occasions associated with at least one type of reference signal measurement. Furthermore, 1002 may be performed by a scalable TD RS occasion configuring component 1240.

In some aspects, the at least one configuration of the at least one set of one or more TD RS occasions may include at least one of a length of the TD RS occasions or a number of TD RS occasions in the at least one set of one or more TD RS occasions is based on a bandwidth of the TD RS occasions. In one aspect, a length of a set of one or more TD RS occasions may be determined based on alignment with a symbol. The length of the set of TD RS occasions may be based on one or more of a cyclic prefix length, a sequence length, or a number of TD RS occasions in the set of TD RS occasions. In another aspect, the at least one configuration of the at least one set of one or more TD RS occasions may include at least one of a phase coherency, beam configuration, or port configuration for the one or more TD RS occasions. In another aspect, the at least one configuration of the at least one set of one or more TD RS occasions may include at least one of a reference signal sequence or a TD RS occasion length for the one or more TD RS occasions. Also, at least one of a reference signal sequence or a TD RS occasion length for the one or more TD RS occasions may be defined.

At 1010, the base station may transmit one or more TD RS in the at least one set of one or more TD RS occasions based on the at least one configuration of the at least one set of one or more TD RS occasions. For example, at 614 of FIG. 6, the base station 604 may transmit, to the UE 602, one or more TD RS in the at least one set of one or more TD RS occasions based on the at least one configuration of the at least one set of one or more TD RS occasions. Furthermore, 1010 may be performed by a scalable TD RS occasion transmission component 1244.

In one aspect, the RS sequence of the TD RS occasions may include the same base sequence. In another aspect, the one or more TD RS occasions may include a first TD RS occasion and a second TD RS occasion, and the TD RS in the second TD RS occasion may include at least one of a different scrambling, a different base sequence, or a shifts relative to the TD RS received in a first TD RS occasion. The TD RS occasions may include a CP between the first TD RS occasion and the second TD RS occasion.

In some aspects, the TD RS occasions may be configured contiguously or non-contiguously. In one aspect, the at least one set of one or more TD RS occasions may include a subset of one or more TD RS occasions that are contiguous in time. In such case, each TD RS occasion of the subset of one or more TD RS occasions may include same base sequence, and the subset of one or more TD RS occasions may include at least one of a single CP or a single GI. In another aspect, the one or more TD RS occasions are non-contiguous in time, and the at least one set of one or more TD RS occasions comprises at least one of a CP or a GI provided between each TD RS occasion of the one or more TD RS occasions. The at least one set of one or more TD RS occasions may also include a time gap for beam switching.

In one aspect, the TD RS may be scrambled in the at least one set of one or more TD RS occasions based on a cell-specific scrambling or a UE-specific scrambling. In another aspect, the at least one set of one or more TD RS occasions is received based on an OCC.

Figure 11:
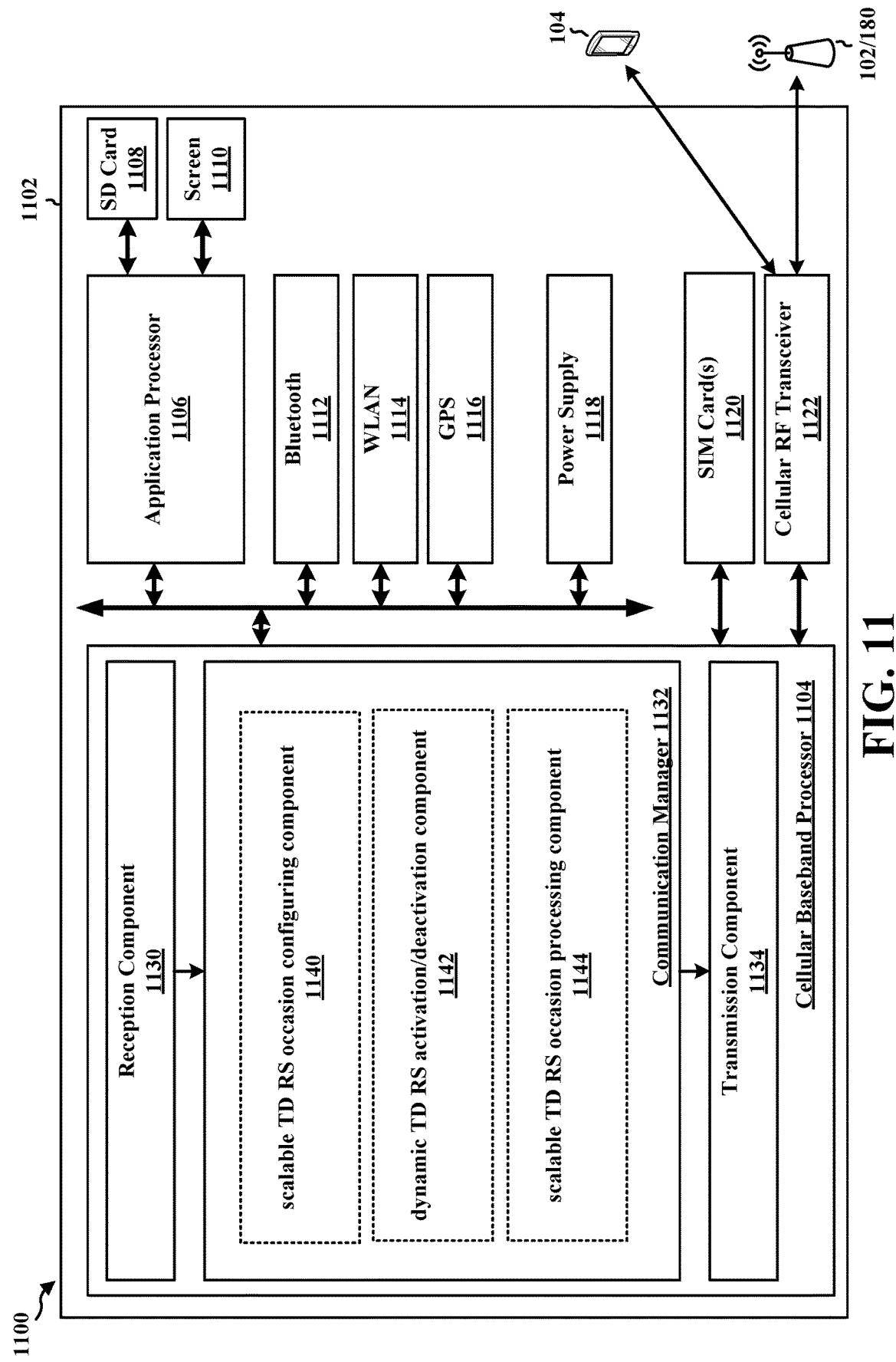
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 902 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or B S 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the cellular baseband processor 1104, and in another configuration, the apparatus 1102 may be the entire UE (e.g., see 350 of FIG. 3) and include the additional modules of the apparatus 1102.

The communication manager 1132 includes a scalable TD RS occasion configuring component 1140 that is configured to receive the at least one configuration of the at least one set of one or more TD RS occasions associated with the at least one type of reference signal measurement, and transmit an indication of support for phase coherence across multiple TD RS occasions, e.g., as described in connection with 702, 704, and 802. The communication manager 1132 further includes a dynamic TD RS activation/deactivation component 1142 that is configured to receive an indication of at least one pattern of the one or more TD RS occasions activating the at least one pattern of the one or more TD RS occasion, and receive the deactivation indication for at least one TD RS occasion in the at least one pattern of the one or more TD RS occasions, e.g., as described in connection with 706 and 708. The communication manager 1132 further includes a scalable TD RS occasion processing component 1144 that is configured to receive the one or more TD RS in the at least one set of one or more TD RS occasions based on the at least one configuration of the at least one set of one or more TD RS occasions, process a first TD RS in a group of TD RS occasions of the at least one set of one or more TD RS occasions based on a first configuration of the at least one configuration, and process a second TD RS in a subset of the at least one set of one or more TD RS occasions based on a second configuration of the at least one configuration, e.g., as described in connection with 710, 712, 714, and 810.

The apparatus may include additional components that perform each of the blocks of the algorithm in the flowcharts of FIGS. 6, 7, and 8. As such, each block in the flowcharts of FIGS. 6, 7, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving, from a base station, at least one configuration of at least one set of one or more TD RS occasions associated with at least one type of reference signal measurement, and means for receiving one or more TD RS in the at least one set of one or more TD RS occasions based on the at least one configuration of the at least one set of one or more TD RS occasions. The apparatus 1102 includes means for receiving a CP between the first TD RS occasion and the second TD RS occasion, and means for transmitting an indication of support for phase coherence across multiple TD RS occasions. The apparatus 1102 includes means for processing a first TD RS in a group of TD RS occasions of the at least one set of one or more TD RS occasions based on a first configuration of the at least one configuration, and means for processing a second TD RS in a subset of the at least one set of one or more TD RS occasions based on a second configuration of the at least one configuration. The apparatus 1102 includes means for receiving an indication of at least one pattern of the one or more TD RS occasions, and means for receiving a deactivation indication for at least one TD RS occasion in the at least one pattern of the one or more TD RS occasions. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
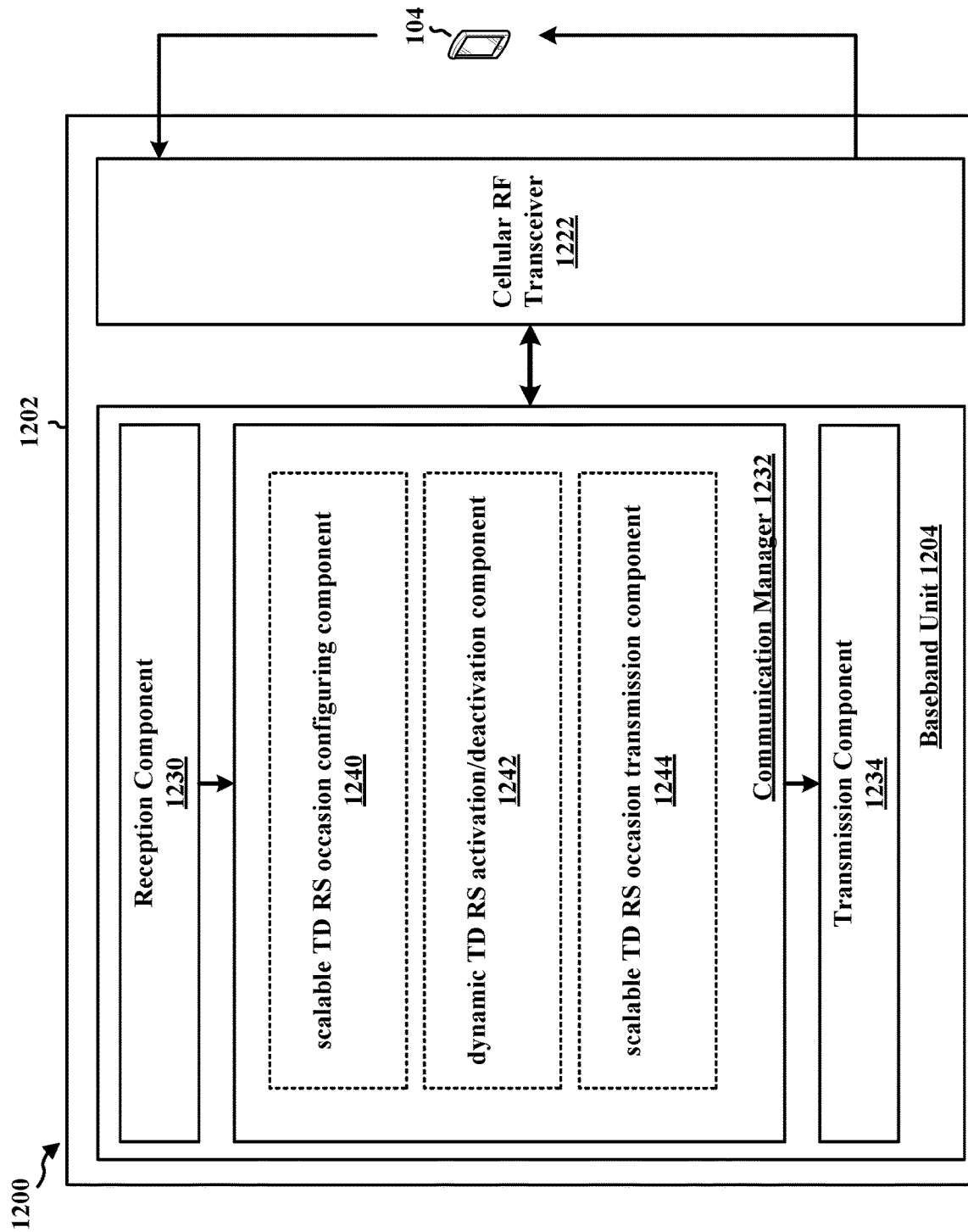
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 124. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a scalable TD RS occasion configuring component 1240 that is configured to transmit at least one configuration of at least one set of one or more TD RS occasions associated with at least one type of reference signal measurement to a UE, and receive the indication of support for phase coherence across multiple TD RS occasions, e.g., as described in connection with 902, 904, and 1002. The communication manager 1232 further includes a dynamic TD RS activation/deactivation component 1242 that is configured to transmit an indication of at least one pattern of the one or more TD RS occasions activating at least one pattern of the one or more TD RS occasions, and transmit a deactivation indication for at least one TD RS occasion in the at least one pattern of the one or more TD RS occasions, e.g., as described in connection with 906 and 908. The communication manager 1232 includes a scalable TD RS occasion transmission component 1244 that is configured to transmit one or more TD RS in the at least one set of one or more TD RS occasions based on the at least one configuration of the at least one set of one or more TD RS occasions, e.g., as described in connection with 910 and 1010.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for transmitting, to a UE, at least one configuration of at least one set of one or more TD RS occasions associated with at least one type of reference signal measurement, and means for transmitting one or more TD RS in the at least one set of the one or more TD RS occasions to the UE based on the at least one configuration of the at least one set of one or more TD RS occasions. The apparatus 1202 includes means for transmitting a CP between the first TD RS occasion and the second TD RS occasion, and means for receiving an indication of support for phase coherence across multiple TD RS occasions. The apparatus 1202 includes means for transmitting an indication of at least one pattern of the one or more TD RS occasions, and means for transmitting a deactivation indication for at least one TD RS occasion in the at least one pattern of the one or more TD RS occasions. The means may be one or more of the components of the apparatus 1202 configured to perform the functions recited by the means. As described supra, the apparatus 1202 may include the TX Processor 316, the RX Processor 370, and the controller/ processor 375. As such, in one configuration, the means may be the TX Processor 316, the RX Processor 370, and the controller/processor 375 configured to perform the functions recited by the means.

A base station may transmit at least one configuration of at least one set of one or more TD RS occasions associated with at least one type of reference signal measurement. The type of reference signal measurement may be a particular measurement, e.g., channel estimation, tracking, beam management, etc., or may refer to a quality level for the measurement. At least one of a reference signal sequence or a TD RS occasion length for one or more TD RS occasions may be defined.

The base station may transmit an indication to dynamically activate or deactivate at least one pattern of one or more TD RS occasions. In one aspect, at least one pattern of one or more TD RS occasions may include a default pattern of one or more TD RS occasions. In another aspect, the indication of at least one pattern of one or more TD RS occasions may include a time duration for repeating at least one pattern of one or more TD RS occasions.

A UE may receive one or more TD RS in at least one set of one or more TD RS occasions based on at least one configuration of the one or more TD RS occasions and an indication of at least one pattern of the one or more TD RS occasions. In one aspect, the TD RS occasions may include the same base sequence or different sequences. In another aspect, the TD RS occasions may be configured contiguously or non-contiguously.

The UE may also process the TD RS in one or more TD RS occasions. In one aspect, the UE may process a first TD RS in a group of TD RS occasions of at least one set of one or more TD RS occasions based on a first configuration of the at least one configuration, where the group of TD RS occasions includes more than one sets of one or more TD RS occasions. In another aspect, the UE may process a second TD RS in a subset of at least one set of one or more TD RS occasions based on a second configuration of at least one configuration.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, including at least one processor coupled to a memory, the at least one processor and the memory configured to receive, from a base station, at least one configuration of at least one set of one or more TD RS occasions associated with at least one type of reference signal measurement, and receive, from the base station, one or more TD RS in the at least one set of one or more TD RS occasions based on the at least one configuration of the at least one set of one or more TD RS occasions.

Aspect 2 is the apparatus of aspect 1, further including a transceiver coupled to the at least one processor.

Aspect 3 is the apparatus of any of aspects 1 and 2, where each TD RS occasion of the at least one set of one or more TD RS occasions includes a same base sequence.

Aspect 4 is the apparatus of any of aspects 1 to 3, where the TD RS received in a second TD RS occasion includes at least one of a different scrambling, a different base sequence, or shifts relative to the TD RS received in a first TD RS occasion, and the at least one processor and the memory are further configured to receive a CP between the first TD RS occasion and the second TD RS occasion.

Aspect 5 is the apparatus of any of aspects 1 to 4, where the at least one set of one or more TD RS occasions includes a subset of one or more TD RS occasions that are contiguous in time.

Aspect 6 is the apparatus of aspect 5, where each TD RS occasion of the subset of one or more TD RS occasions includes same base sequence, and the subset of one or more TD RS occasions includes at least one of a single CP or a single GI.

Aspect 7 is the apparatus of any of aspects 1 to 6, where the one or more TD RS occasions are non-contiguous in time, and the at least one set of one or more TD RS occasions includes at least one of a CP or a GI provided between each TD RS occasion of the one or more TD RS occasions.

Aspect 8 is the apparatus of aspect 7, where the at least one set of one or more TD RS occasions further includes a time gap for beam switching.

Aspect 9 is the apparatus of any of aspects 1 to 8, where the TD RS is scrambled in the at least one set of one or more TD RS occasions based on a cell-specific scrambling or a UE-specific scrambling.

Aspect 10 is the apparatus of aspect 9, where the at least one set of one or more TD RS occasions is received based on an OCC.

Aspect 11 is the apparatus of any of aspects 1 to 10, where a length of a set of one or more TD RS occasions is based on alignment with a symbol.

Aspect 12 is the apparatus of aspect 11, where the length of the set of TD RS occasions is based on one or more of a cyclic prefix length, a sequence length, or a number of TD RS occasions in the set of TD RS occasions.

Aspect 13 is the apparatus of any of aspects 1 to 12, where the at least one configuration of the at least one set of one or more TD RS occasions includes at least one of a length of the TD RS occasions or a number of TD RS occasions in the at least one set of one or more TD RS occasions is based on a bandwidth of the TD RS occasions.

Aspect 14 is the apparatus of any of aspects 1 to 13, where the at least one configuration of the at least one set of one or more TD RS occasions includes at least one of a phase coherency, beam configuration, or port configuration for the one or more TD RS occasions.

Aspect 15 is the apparatus of any of aspects 1 to 14, where the at least one processor and the memory are further configured to transmit, to the base station, an indication of support for phase coherence across multiple TD RS occasions.

Aspect 16 is the apparatus of any of aspects 1 to 15, where the at least one configuration of the at least one set of one or more TD RS occasions includes at least one of a reference signal sequence or a TD RS occasion length for the one or more TD RS occasions.

Aspect 17 is the apparatus of any of aspects 1 to 16, where at least one of a reference signal sequence or a TD RS occasion length for the one or more TD RS occasions is defined.

Aspect 18 is the apparatus of any of aspects 1 to 17, where the at least one processor and the memory are further configured to process a first TD RS in a group of TD RS occasions of the at least one set of one or more TD RS occasions based on a first configuration of the at least one configuration, where the group of TD RS occasions includes a first set of one or more TD RS occasions of the at least one set of one or more TD RS occasions and a second set of one or more TD RS occasions of the at least one set of one or more TD RS occasions, the first set of one or more TD RS occasions being phase coherent with the second set of one or more TD RS occasions.

Aspect 19 is the apparatus of any of aspects 1 to 18, where the at least one processor and the memory are further configured to process a second TD RS in a subset of the at least one set of one or more TD RS occasions based on a second configuration of the at least one configuration.

Aspect 20 is the apparatus of any of aspects 1 to 19, where the at least one processor and the memory are further configured to receive, from the base station, an indication of at least one pattern of the one or more TD RS occasions, the TD RS being received at least one set of one or more TD RS occasions based on one or more of the at least one pattern of the one or more TD RS occasions.

Aspect 21 is the apparatus of aspect 20, where the at least one pattern of the one or more TD RS occasions includes a default pattern of the one or more TD RS occasions.

Aspect 22 is the apparatus of any of aspects 20 and 21, where the indication of the at least one pattern of the one or more TD RS occasions includes a first pattern of a first set of one or more TD RS occasions and a second pattern of a second set of one or more TD RS occasions, and the TD RS is received based on a union of the first pattern of the first set of one or more TD RS occasions and the second pattern of the second set of one or more TD RS occasions.

Aspect 23 is the apparatus of any of aspects 20 to 22, where the indication of the at least one pattern of the one or more TD RS occasions includes a first pattern of a first set of one or more TD RS occasions and a second pattern of a second set of one or more TD RS occasions, at least a part of the second pattern colliding with the first pattern, and the TD RS is received based on one of the first pattern or the second pattern.

Aspect 24 is the apparatus of aspect 23, where the one of the first pattern and the second pattern is determined based on the type of the first set of one or more TD RS occasions and a type of the second set of one or more TD RS occasions.

Aspect 25 is the apparatus of any of aspects 20 to 24, where the at least one processor and the memory are further configured to receive, from the base station, a deactivation indication for at least one TD RS occasion in the at least one pattern of the one or more TD RS occasions.

Aspect 26 is the apparatus of any of aspects 20 to 25, where the indication of the at least one pattern of the one or more TD RS occasions includes a time duration for repeating the at least one pattern of the one or more TD RS occasions.

Aspect 27 is the apparatus of any of aspects 20 to 26, where the indication of the at least one pattern of the one or more TD RS occasions is cell-specific or UE-specific.

Aspect 28 is a method of wireless communication for implementing any of aspects 1 to 27.

Aspect 29 is an apparatus for wireless communication including means for implementing any of aspects 1 to 27.

Aspect 30 is a computer-readable medium storing computer executable code, where the code when executed by a processor causes the processor to implement any of aspects 1 to 27.

Aspect 31 is an apparatus for wireless communication at a base station, including at least one processor coupled to a memory, the at least one processor and the memory configured to transmit, to a UE, at least one configuration of at least one set of one or more TD RS occasions associated with at least one type of reference signal measurement, and transmit one or more TD RS in the at least one set of the one or more TD RS occasions to the UE based on the at least one configuration of the at least one set of one or more TD RS occasions.

Aspect 32 is the apparatus of aspect 31, further including a transceiver coupled to the at least one processor.

Aspect 33 is the apparatus of any of aspects 31 and 32, where the TD RS transmitted in the one or more TD RS occasions includes a same base sequence.

Aspect 34 is the apparatus of any of aspects 31 to 33, where the TD RS transmitting in a second TD RS occasion includes at least one of a different scrambling, a different base sequence, or a shifts relative to the TD RS received in a first TD RS occasion, where the at least one processor and the memory are further configured to transmit a CP between the first TD RS occasion and the second TD RS occasion.

Aspect 35 is the apparatus of any of aspects 31 to 34, where the at least one set of one or more TD RS occasions includes a subset of one or more TD RS occasions that are contiguous in time.

Aspect 36 is the apparatus of aspect 35, where each TD RS occasion of the subset of one or more TD RS occasions includes same base sequence, and the subset of one or more TD RS occasions includes at least one of a single CP or a single GI.

Aspect 37 is the apparatus of any of aspects 31 to 36, where the one or more TD RS occasions are non-contiguous in time, and the at least one set of one or more TD RS occasions includes at least one of a CP or a GI provided between each TD RS occasion of the one or more TD RS occasions.

Aspect 38 is the apparatus of aspect 37, where the at least one set of one or more TD RS occasions further includes a time gap for beam switching.

Aspect 39 is the apparatus of any of aspects 31 to 38, where the TD RS is scrambled in the at least one set of one or more TD RS occasions based on a cell-specific scrambling or a UE-specific scrambling.

Aspect 40 is the apparatus of aspect 39, where the at least one set of one or more TD RS occasions is transmitted based on an OCC.

Aspect 41 is the apparatus of any of aspects 31 to 40, where a length of a set of one or more TD RS occasions is based on alignment with a symbol.

Aspect 42 is the apparatus of aspect 41, where the length of the set of TD RS occasions is based on one or more of a cyclic prefix length, a sequence length, or a number of TD RS occasions in the set of TD RS occasions.

Aspect 43 is the apparatus of any of aspects 31 to 42, where the at least one configuration of the at least one set of one or more TD RS occasions including at least one of a length of the TD RS occasions or a number of TD RS occasions in the at least one set of one or more TD RS occasions based on a bandwidth of the one or more TD RS occasions.

Aspect 44 is the apparatus of any of aspects 31 to 43, where the at least one configuration of the at least one set of one or more TD RS occasions includes at least one of a phase coherency, beam configuration, or port configuration for the one or more TD RS occasions.

Aspect 45 is the apparatus of any of aspects 31 to 44, where the at least one processor and the memory are further configured to receive, from the UE, an indication of support for phase coherence across multiple TD RS occasions.

Aspect 46 is the apparatus of any of aspects 31 to 45, where at least one configuration of the at least one set of one or more TD RS occasions at least one of a reference signal sequence or a TD RS occasion length for the one or more TD RS occasions.

Aspect 47 is the apparatus of any of aspects 31 to 46, where at least one of a reference signal sequence or a TD RS occasion length for the one or more TD RS occasions is defined.

Aspect 48 is the apparatus of any of aspects 31 to 47, where the at least one processor and the memory are further configured to transmit, to the UE, an indication of at least one pattern of the one or more TD RS occasions, the TD RS being received at least one set of one or more TD RS occasions based on one or more of the at least one pattern of the one or more TD RS occasions.

Aspect 49 is the apparatus of aspect 48, where the at least one pattern of the one or more TD RS occasions includes a default pattern of the one or more TD RS occasions.

Aspect 50 is the apparatus of any of aspects 48 and 49, where the indication of the at least one pattern of the one or more TD RS occasions includes a first pattern of a first set of one or more TD RS occasions and a second pattern of a second set of one or more TD RS occasions, and the TD RS is received based on a union of the first pattern of the first set of one or more TD RS occasions and the second pattern of the second set of one or more TD RS occasions.

Aspect 51 is the apparatus of any of aspects 48 to 50, where the indication of the at least one pattern of the one or more TD RS occasions includes a first pattern of a first set of one or more TD RS occasions and a second pattern of a second set of one or more TD RS occasions, at least a part of the second pattern colliding with the first pattern, and the TD RS is received based on one of the first pattern or the second pattern.

Aspect 52 is the apparatus of aspect 51, where the one of the first pattern and the second pattern is determined based on a type of the first set of one or more TD RS occasions and a type of the second set of one or more TD RS occasions.

Aspect 53 is the apparatus of any of aspects 48 to 52, where the at least one processor and the memory are further configured to transmit, to the UE, a deactivation indication for at least one TD RS occasion in the at least one pattern of the one or more TD RS occasions.

Aspect 54 is the apparatus of any of aspects 48 to 53, where the indication of the at least one pattern of the one or more TD RS occasions includes a time duration for repeating the at least one pattern of the one or more TD RS occasions.

Aspect 55 is the apparatus of any of aspects 48 to 54, where the indication of the at least one pattern of the one or more TD RS occasions is cell-specific or UE-specific.

Aspect 56 is a method of wireless communication for implementing any of aspects 31 to 55.

Aspect 57 is an apparatus for wireless communication including means for implementing any of aspects 31 to 55.

Aspect 58 is a computer-readable medium storing computer executable code, where the code when executed by a processor causes the processor to implement any of aspects 31 to 55.

What is claimed is:

1. An apparatus for wireless communication at a user equipment (UE), comprising:
   memory; and
   at least one processor coupled to the memory and configured to:
   receive a first configuration of a first set of one or more time-division reference signal (TD RS) occasions of a TD RS, the first configuration being associated with a first type of reference signal measurement;
   receive a second configuration of a second set of the one or more TD RS occasions of the TD RS, the second configuration being associated with a second type of the reference signal measurement;
   measure the first type of the reference signal measurement on the first set of the one or more TD RS occasions of the TD RS based on the first configuration; and
   measure the second type of the reference signal measurement on the second set of the one or more TD RS occasions of the TD RS based on the second configuration.

2. The apparatus of claim 1, further comprising a transceiver coupled to the at least one processor.

3. The apparatus of claim 1, wherein each TD RS occasion of the first set of one or more TD RS occasions comprises a same base sequence.

4. The apparatus of claim 1, wherein the TD RS received in a second TD RS occasion comprises at least one of a different scrambling, a different base sequence, or a shifts relative to the TD RS received in a first TD RS occasion, and the at least one processor is further configured to:
   receive a cyclic prefix (CP) between the first TD RS occasion and the second TD RS occasion.

5. The apparatus of claim 1, wherein at least one of the first set of one or more TD RS occasions or the second set of one or more TD RS occasions comprises a subset of one or more TD RS occasions that are contiguous in time.

6. The apparatus of claim 5, wherein each TD RS occasion of the subset of one or more TD RS occasions comprises same base sequence, and the subset of one or more TD RS occasions comprises at least one of a single cyclic prefix (CP) or a single guard interval (GI).

7. The apparatus of claim 1, wherein the one or more TD RS occasions are non-contiguous in time, and at least one of the first set of one or more TD RS occasions or the second set of one or more TD RS occasions comprises at least one of a cyclic prefix (CP) or a guard interval (GI) provided between each TD RS occasion of the one or more TD RS occasions.

8. The apparatus of claim 7, wherein the at least one of the first set of one or more TD RS occasions or the second set of one or more TD RS occasions further comprises a time gap for beam switching.

9. The apparatus of claim 1, wherein the TD RS is scrambled in the at least one set of one or more TD RS occasions based on a cell-specific scrambling or a UE-specific scrambling.

10. The apparatus of claim 9, wherein the TD RS is received in at least one of the first set of one or more TD RS occasions or the second set of one or more TD RS occasions based on an orthogonal cover code (OCC).

11. The apparatus of claim 1, wherein a length of a set of one or more TD RS occasions is based on alignment with a symbol.

12. The apparatus of claim 11, wherein the length of the set of TD RS occasions is based on one or more of a cyclic prefix (CP) length, a sequence length, or a number of TD RS occasions in the set of TD RS occasions.

13. The apparatus of claim 1, wherein at least one of the first set of one or more TD RS occasions or the second set of one or more TD RS occasions comprises at least one of a length of the TD RS occasions or a number of TD RS occasions based on a bandwidth of the TD RS occasions.

14. The apparatus of claim 1, wherein at least one of the first set of one or more TD RS occasions or the second set of one or more TD RS occasions comprises at least one of a phase coherency, beam configuration, or port configuration for the one or more TD RS occasions.

15. The apparatus of claim 1, wherein the at least one processor is further configured to:
    transmit an indication of support for phase coherence across multiple TD RS occasions.

16. The apparatus of claim 1, wherein at least one of the first set of one or more TD RS occasions or the second set of one or more TD RS occasions comprises at least one of a reference signal sequence or a TD RS occasion length for the one or more TD RS occasions.

17. The apparatus of claim 1, wherein at least one of a reference signal sequence or a TD RS occasion length for the one or more TD RS occasions is defined.

18. The apparatus of claim 1, wherein the at least one processor is further configured to:
    process a first TD RS in a group of TD RS occasions of the first set of one or more TD RS occasions based on the first configuration,
    wherein the group of TD RS occasions comprises a first subset of one or more TD RS occasions of the first set of one or more TD RS occasions and a second subset of one or more TD RS occasions of the first set of one or more TD RS occasions, the first subset of one or more TD RS occasions being phase coherent with the second subset of one or more TD RS occasions.

19. The apparatus of claim 1, wherein the at least one processor is further configured to:
    wherein the second set of one or more TD RS occasions comprises a subset of the first set of one or more TD RS occasions.

20. The apparatus of claim 1, wherein the at least one processor is further configured to:
    receive an indication of at least one pattern of the one or more TD RS occasions, at least one of the first type of the reference signal measurement or the second type of the reference signal measurement being based on one or more of the at least one pattern of the one or more TD RS occasions.

21. The apparatus of claim 20, wherein the at least one pattern of the one or more TD RS occasions includes a default pattern of the one or more TD RS occasions.

22. The apparatus of claim 20, wherein the indication of the at least one pattern of the one or more TD RS occasions includes a first pattern of a first subset of one or more TD RS occasions and a second pattern of a second subset of one or more TD RS occasions, and the TD RS is received based on a union of the first pattern of the first subset of one or more TD RS occasions and the second pattern of the second subset of one or more TD RS occasions.

23. The apparatus of claim 20, wherein the indication of the at least one pattern of the one or more TD RS occasions includes a first pattern of a first subset of one or more TD RS occasions and a second pattern of a second subset of one or more TD RS occasions, at least a part of the second pattern colliding with the first pattern, and the TD RS is received based on one of the first pattern or the second pattern.

24. The apparatus of claim 23, wherein the one of the first pattern and the second pattern is determined based on a type of the first subset of one or more TD RS occasions and a type of the second subset of one or more TD RS occasions.

25. The apparatus of claim 20, wherein the at least one processor is further configured to:
receive a deactivation indication for at least one TD RS occasion in the at least one pattern of the one or more TD RS occasions.

26. The apparatus of claim 20, wherein the indication of the at least one pattern of the one or more TD RS occasions includes a time duration for repeating the at least one pattern of the one or more TD RS occasions.

27. The apparatus of claim 20, wherein the indication of the at least one pattern of the one or more TD RS occasions is cell-specific or UE-specific.

28. The apparatus of claim 1, wherein the first type of the reference signal measurement is for a first channel and the second type of the reference signal measurement is for a second channel.

29. The apparatus of claim 1, wherein the first type of the reference signal measurement is for a first instance of a channel and the second type of the reference signal measurement is for a second instance of the channel.

30. The apparatus of claim 1, wherein the first type of the reference signal measurement is for one of channel estimation, tracking, or beam management; and wherein the second type of the reference signal measurement is for a different one of the channel estimation, the tracking, the beam management.

31. The apparatus of claim 1, wherein the TD RS comprises a single carrier waveform and is a unified reference signal that is configurable for different channels or different types of reference signal measurements.

32. A method of wireless communication at a user equipment (UE), comprising:
receiving a first configuration of a first set of one or more time-division reference signal (TD RS) occasions of a TD RS, the first configuration being associated with a first type of reference signal measurement;
receiving a second configuration of a second set of the one or more TD RS occasions of the TD RS, the second configuration being associated with a second type of the reference signal measurement;
measuring the first type of the reference signal measurement on the first set of the one or more TD RS occasions of the TD RS based on the first configuration; and
measuring the second type of the reference signal measurement on the second set of the one or more TD RS occasions of the TD RS based on the second configuration.

33. An apparatus for wireless communication at a network entity, comprising:
memory; and
at least one processor coupled to the memory and configured to:
configure a user equipment (UE) with a first configuration of a first set of one or more time-division reference signal (TD RS) occasions of a TD RS, the first configuration being associated with a first type of reference signal measurement;
configure the UE with a second configuration of a second set of the one or more TD RS occasions of the TD RS, the second configuration being associated with a second type of the reference signal measurement; and
transmit the TD RS in the first set of the one or more TD RS occasions according to the first configuration and the second set of the one or more TD RS occasions according to the second configuration.

34. A method of wireless communication at a network entity, comprising:
configuring a user equipment (UE) with a first configuration of a first set of one or more time-division reference signal (TD RS) occasions of a TD RS, the first configuration being associated with a first type of reference signal measurement;
configuring the UE with a second configuration of a second set of the one or more TD RS occasions of the TD RS, the second configuration being associated with a second type of the reference signal measurement; and
transmitting the TD RS to the UE in the first set of the one or more TD RS occasions according to the first configuration and the second set of the one or more TD RS occasions according to the second configuration.

* * * * *